(12) United States Patent
Verbeek et al.

(10) Patent No.: US 8,149,668 B2
(45) Date of Patent: Apr. 3, 2012

(54) OPTICAL DISK DRIVE AND METHOD FOR DETERMINING DISK TYPE

(75) Inventors: Petrus Antonius Verbeek, Taipei (TW); Jean Philippe van Damme, Taipei (TW); Mohamad-Hussein El-Husseini, Taipei (TW); Stefan Geusens, Taipei (TW)

(73) Assignee: Lite-On It Corporation, Taipei (TW)

( * ) Notice: Subject to any disclaimer, the term of this patent is extended or adjusted under 35 U.S.C. 154(b) by 102 days.

(21) Appl. No.: 12/566,964

(22) Filed: Sep. 25, 2009

(65) Prior Publication Data

US 2010/0157763 A1 Jun. 24, 2010

Related U.S. Application Data

(60) Provisional application No. 61/140,776, filed on Dec. 24, 2008.

(51) Int. Cl.
*G11B 27/36* (2006.01)
*G11B 7/20* (2006.01)

(52) U.S. Cl. ......... 369/53.22; 369/94; 369/53.23; 369/53.21; 369/44.25; 369/44.27

(58) Field of Classification Search ............ 369/94, 369/53.2, 53.22, 53.23, 53.21, 44.25, 44.27
See application file for complete search history.

(56) References Cited

U.S. PATENT DOCUMENTS

| | | | |
|---|---|---|---|
| 2004/0190417 A1* | 9/2004 | Watanabe et al. | 369/53.11 |
| 2004/0202084 A1* | 10/2004 | Manoh et al. | 369/94 |
| 2005/0052977 A1* | 3/2005 | Sun | 369/53.23 |
| 2007/0165498 A1* | 7/2007 | Maruyama | 369/44.27 |
| 2007/0171782 A1* | 7/2007 | Masuda et al. | 369/44.27 |
| 2009/0092010 A1* | 4/2009 | Kuijper et al. | 369/44.27 |

* cited by examiner

*Primary Examiner* — Joseph Feild
*Assistant Examiner* — Aneeta Yodichkas
(74) *Attorney, Agent, or Firm* — Thomas, Kayden, Horstemeyer & Risley, LLP

(57) ABSTRACT

A method of determining a disk type of an optical disk is provided to comprise steps of: using a first light path for forming an incident beam; moving an objective lens system corresponding to the first light path from a start position towards the optical disk; receiving a sensor output signal during the movement of the objective lens system, wherein the sensor output signal includes a central aperture signal; determining the disk type of the optical disk according to the central aperture signal.

7 Claims, 15 Drawing Sheets

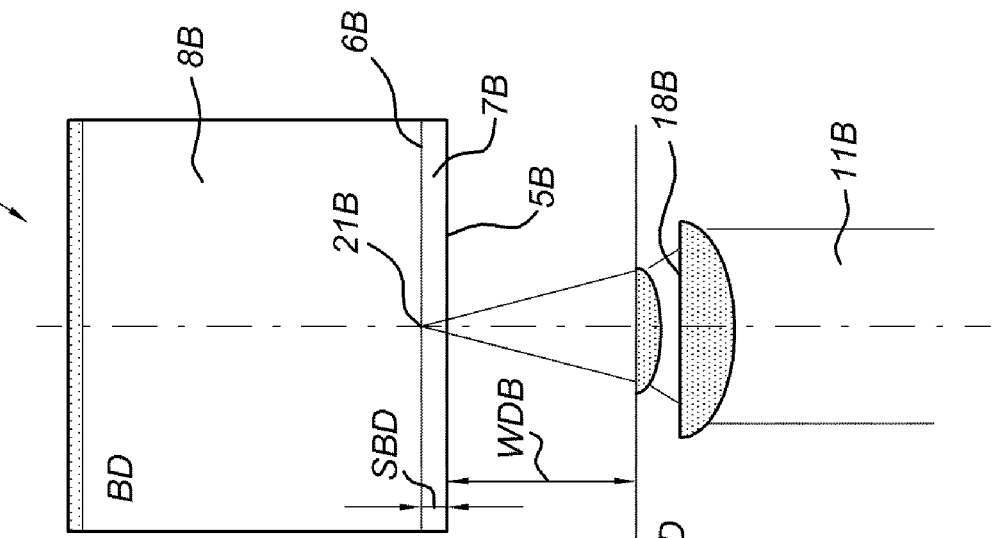
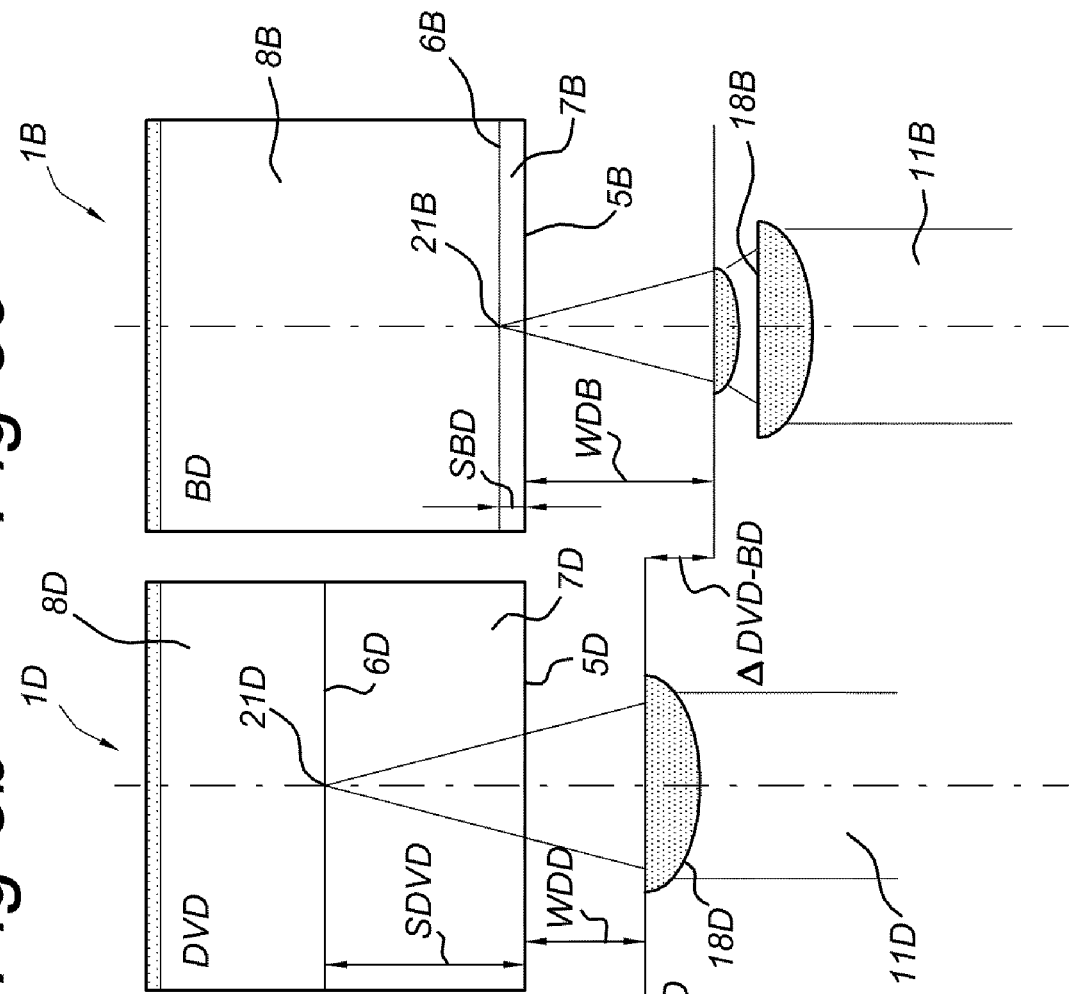
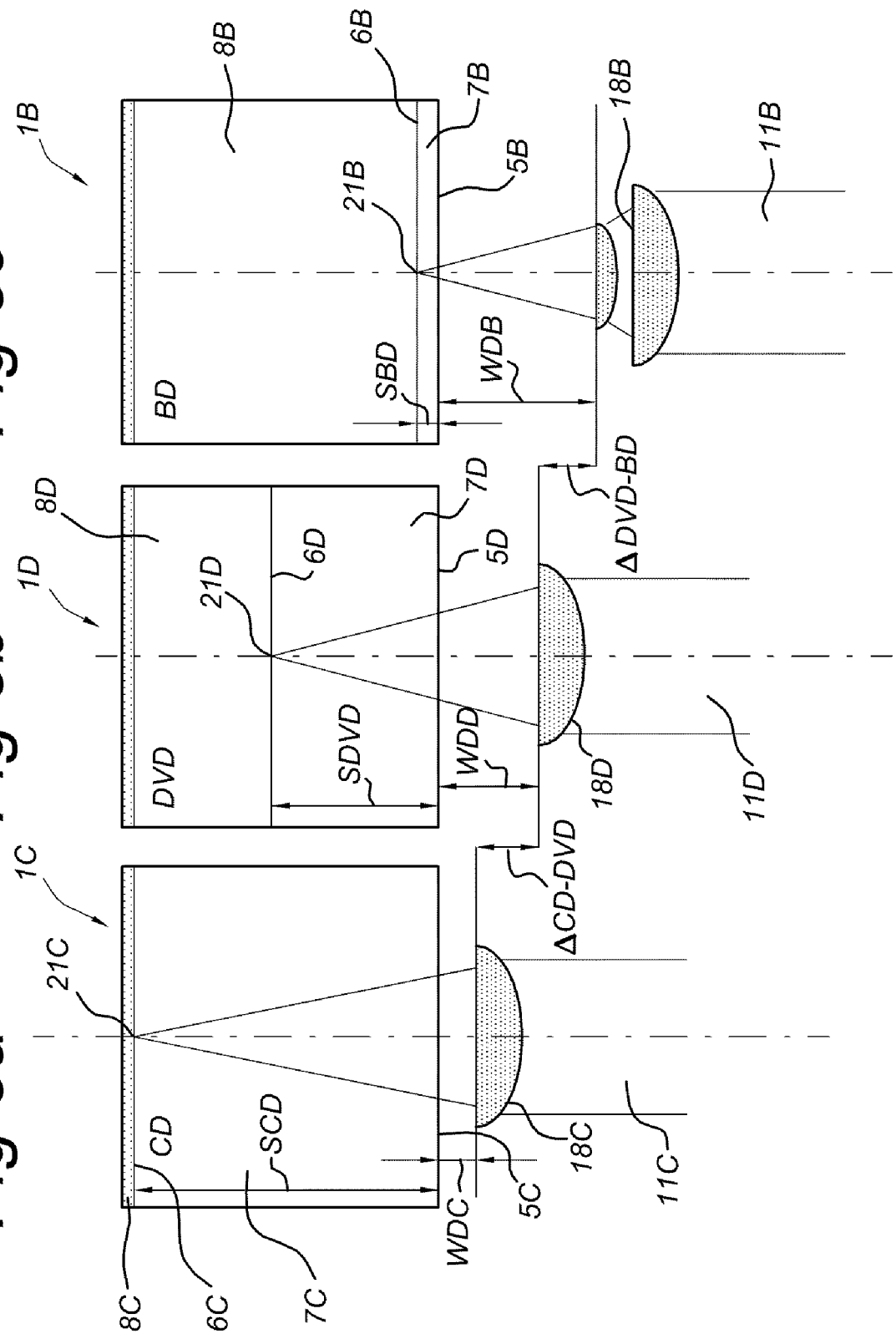

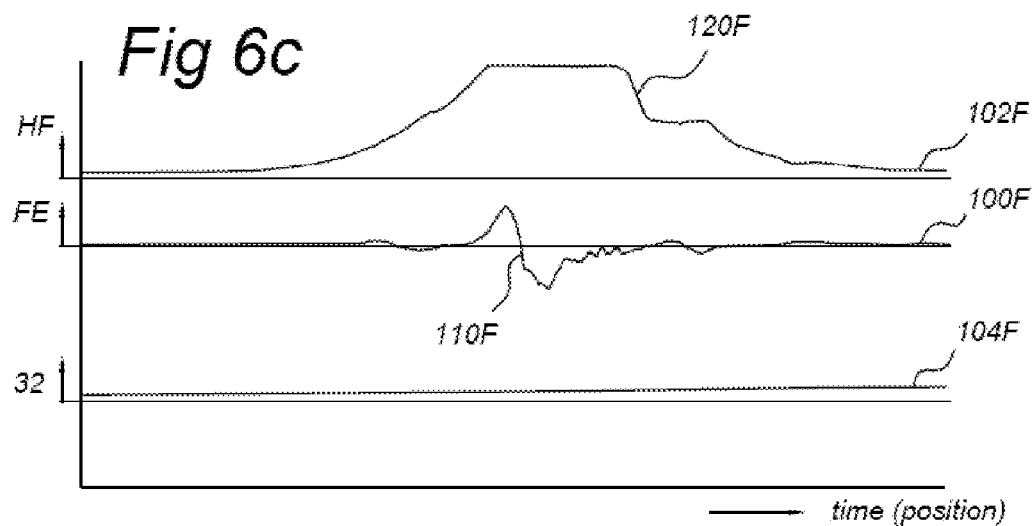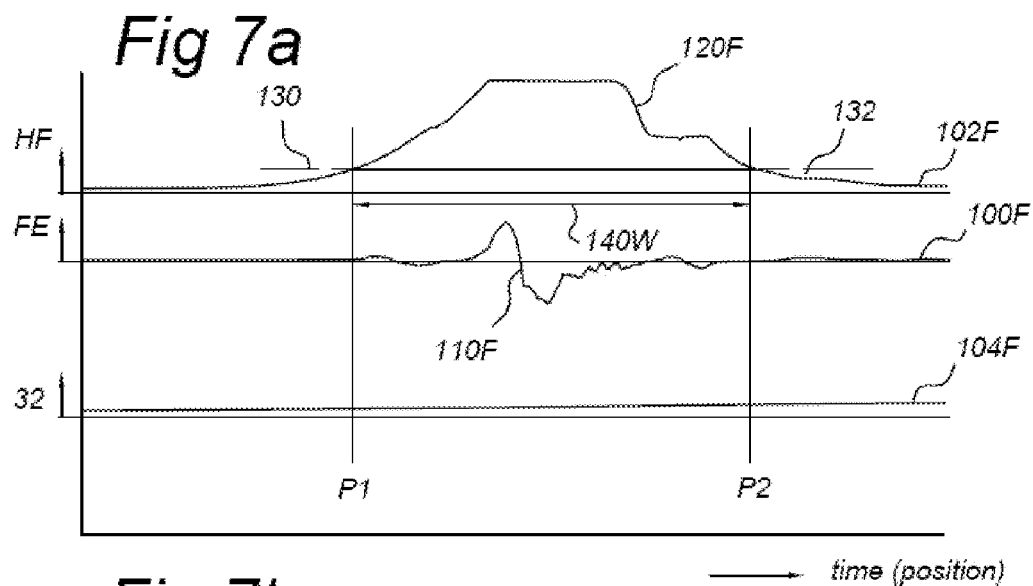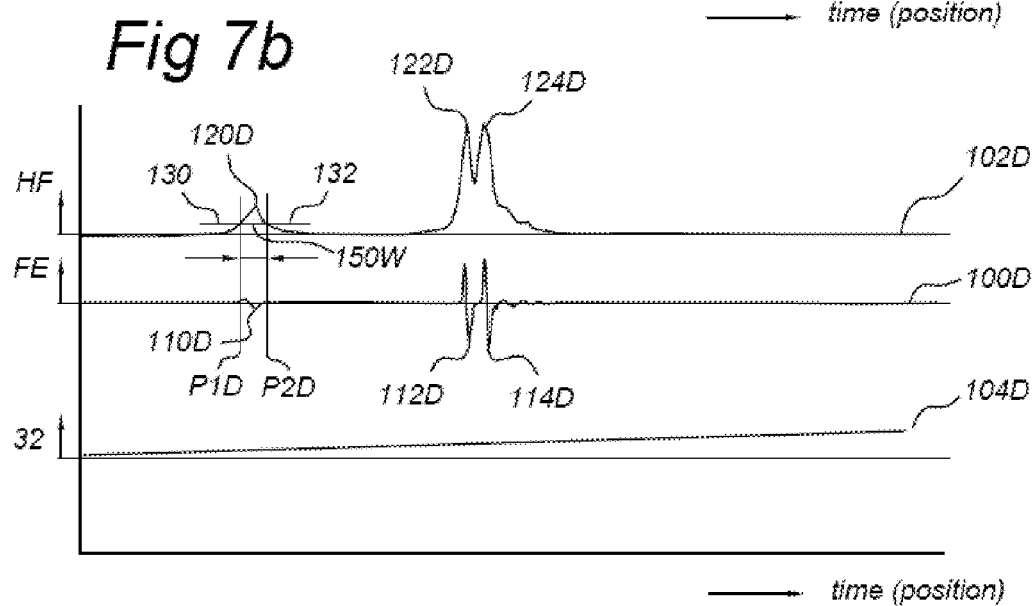

OPTICAL DISK DRIVE AND METHOD FOR DETERMINING DISK TYPE

CROSS REFERENCE TO RELATED PATENT APPLICATION

This patent application is based on a U.S. provisional patent application No. 61/140,776 filed on Dec. 24, 2008, incorporated herein for reference.

FIELD OF THE INVENTION

The invention relates to an optical disk drive and method for determining a disk type, and more particularly to the optical disk drive and the method for determining the disk type associated with a substrate thickness of an optical disk.

BACKGROUND OF THE INVENTION

Optical disks may generally be used as removable media for retrieving and storing digital information, e.g. data, audio and video. Optical discs may be classified into disk types according to disk generations into Compact Disc (CD), Digital Versatile Disc (DVD) and Blu-Ray Disc (BD). Optical discs may further or alternatively be classified into read-only (ROM), recordable (R) and rewritable (RW, RE, RAM). Currently trends include miniaturizing a spot diameter using a high numerical aperture (NA) objective lens and using increasingly shorter wavelength light sources.

An optical disk drive may be arranged to handle optical disks of multiple generations. An optical disk drive may e.g. be arranged to read and write CD-generation disks, DVD-generation disks as well as BD-generation disks. An optical disk drive may alternatively be arranged to e.g. read CD-generation disks and read and write DVD-generation disks, while not being capable of scanning BD-generation disks. Such optical disk drive will reject a BD-generation disk.

Each disk generation may require operation conditions specific for the disk generation. E.g., an optical disk drive may be arranged to scan (read and/or write) a CD-generation disk with a infrared focussing spot using an infrared laser at a numerical aperture of e.g. 0.50 of an objective lens, a DVD-generation disk with a red focussing spot using a red laser at a numerical aperture of e.g. 0.65, and a BD-generation disk with a blue focussing spot using a blue-violet laser at a numerical aperture of e.g. 0.85. Additionally, other operation conditions, such as e.g. scanning velocity, may depend on the disk generation or on the disk type in general.

In starting-up of the optical disk drive, e.g. after loading a new optical disk drive or after powering-on of the optical disk drive, the optical disk drive may thus be arranged for determining a disk type of the optical disk loaded in the optical disk drive. This starting-up may consumer considerable time, referred to as startup time, and may e.g. take several seconds in current prior art optical disk drives.

In determining the disk type, prior art optical disk drives may be arranged to determine the disk generation of an optical disk in the optical disk drive using a measurement of a substrate thickness of the optical disk: CD-generation disks, DVD-generation disks and BD-generation disks have a different substrate thickness, i.e. of approximately 1.1-1.2 mm, 0.6 mm and 0.1 mm respectively.

Known optical disk drives using known methods to determine the disk generation may require a considerable time for the measurement of the substrate thickness, resulting in a considerable startup time.

SUMMARY OF THE INVENTION

It is an object of the invention to provide an optical disk drive and a method to determine the disk generation with an improved startup behaviour. In particular, it is an object of embodiments of the invention to provide an optical disk drive and a method with an improved disk type detection, the disk type being associated with the substrate thickness of an optical disk in an optical disk drive.

It is an object of embodiments of the invention to provide an optical disk drive and a method to determine the disk type with a reduced startup time. In particular, it is an object of the second aspect of invention to provide an optical disk drive and a method with a reduced time for the measurement of the substrate thickness.

A first aspect of the invention provides an optical disk drive for determining a disk type associated with a substrate thickness of an optical disk comprising a substrate, the optical disk drive comprising:

a source to generate a beam, an optical arrangement arranged to direct the beam to the optical disk for forming an incident beam, a sensor arranged to sense a reflected beam from the optical disk by reflecting the incident beam, and to produce a sensor output signal from sensing the reflected beam, the sensor output signal comprising a central aperture signal, a focus system comprising an objective lens system and a focus controller, wherein the objective lens system is arranged to focus the incident beam into a spot, and the focus controller is arranged to generate a focus control signal to drive and position the objective lens system at an actuator position; and a controller arranged to cooperate with the focus controller for moving the objective lens system from a start actuator position towards an end actuator position, to receive the central aperture signal during the movement of the objective lens system, to analyze the central aperture signal for determining the focus actuator position where the central aperture signal crosses a first threshold in a first direction as a first focus actuator position, to analyze the central aperture signal for determining the focus actuator position where the central aperture signal crosses a second threshold in a second direction as a second focus actuator position, the second direction being different to the first direction, and to determine the disk type associated with the substrate thickness from at least the first focus actuator position and the second focus actuator position.

A second aspect of the invention provides an optical disk drive for determining a disk type associated with a substrate thickness of an optical disk comprising a substrate, the optical disk drive comprising:

a first source for generating a first beam, the first source being associated with a first optical disk type, a second source for generating a second beam, the second source being associated with a second optical disk type, the second optical disk type being different from the first optical disk type, an optical arrangement arranged to select a beam from at least the first beam and the second beam and to direct the beam to the optical disk for forming an incident beam, a sensor arranged to sense a reflected beam from the optical disk by reflecting the incident beam, and to produce a sensor output signal, a focus system comprising an objective lens system and a focus controller, wherein the objective lens system is arranged to focus the incident beam into a spot, and the focus controller is arranged to generate a focus control signal for driving and positioning the objective lens system at an actuator position; and a controller arranged to cooperate with the focus controller for moving the objective lens system from a start actuator position towards an end actuator position, to cooperate with the optical arrangement to change the selection of the beam from the first beam to the second beam at least once during the movement of the objective lens system, to receive the sensor output signal while moving the objective lens system, analyze the sensor output signal for determining the focus actuator position where the sensor output signal satisfies a first pre-determined condition as a first focus actuator position, to analyze the sensor output signal for determining the focus actuator position where the sensor output signal satisfies a second pre-determined condition as a second focus actuator position, and to determine the disk type associated with the substrate thickness from at least the first focus actuator position and the second focus actuator position.

Another aspect of the invention provides a method of determining a disk type associated with a substrate thickness of an optical disk comprising a substrate in an optical disk drive, the method comprising:

generating a beam;

directing the beam to the optical disk for forming an incident beam;

sensing a reflected beam from the optical disk by reflecting the incident beam;

producing a sensor output signal from sensing the reflected beam, the sensor output signal comprising a central aperture signal;

operating a focus system comprising an objective lens system and a focus controller, the objective lens being arranged to focus the incident beam into a spot;

generating a focus control signal with the focus controller to drive and position the objective lens system at an actuator position;

moving the objective lens system from a start actuator position towards an end actuator position;

receiving the central aperture signal during the movement of the objective lens system from the start actuator position towards the end actuator position;

analyzing the central aperture signal for determining the focus actuator position where the central aperture signal crosses a first threshold in a first direction as a first focus actuator position;

analyzing the central aperture signal for determining the focus actuator position where the central aperture signal crosses a second threshold in a second direction as a second focus actuator position, the second direction being different to the first direction; and determining the disk type associated with the substrate thickness from at least the first focus actuator position and the second focus actuator position.

Another aspect of the invention provides a method of determining a disk type associated with a substrate thickness of an optical disk comprising a substrate in an optical disk drive, the method comprising:

selectively generating one of a plurality of beams, the plurality of beams comprising a first beam from a first source being associated with a first optical disk type, and a second beam from a second source, the second source being associated with a second optical disk type, the second optical disk type being different from the first optical disk type;

directing the beam to the optical disk for forming an incident beam;

sensing a reflected beam from the optical disk by reflecting the incident beam;

producing a sensor output signal from sensing the reflected beam;

operating a focus system comprising an objective lens system and a focus controller, the objective lens system being arranged to focus the incident beam into a spot;

generating a focus control signal with the focus controller for driving and positioning the objective lens system at an actuator position;

moving the objective lens system from a start actuator position towards an end actuator position;

changing the selection of the beam from the first beam to the second beam at least once during the movement of the objective lens system;

receiving the sensor output signal while moving the objective lens system;

analyzing the sensor output signal for determining the focus actuator position where the sensor output signal satisfies a first pre-determined condition as a first focus actuator position;

analyzing the sensor output signal for determining the focus actuator position where the sensor output signal satisfies a second pre-determined condition as a second focus actuator position; and determining the disk type associated with the substrate thickness from at least the first focus actuator position and the second focus actuator position.

BRIEF DESCRIPTION OF THE DRAWINGS

These and other aspects of the invention will be further elucidated and described in detail with reference to the drawings, in which corresponding reference symbols indicate corresponding parts:

FIG. 5a-FIG. 5c schematically show cross sections of CD-, DVD- and BD-type optical disks, and associated incident beams and objective lens positions;

FIG. 6a-FIG. 6c show examples of a signal traces of a focus error signal, a central aperture signal and a ramp signal during movement of the focus actuator with the objective lens;

FIG. 7a and FIG. 7b show the curves in relation with an embodiment of the first aspect of the invention;

DETAILED DESCRIPTION OF THE PREFERRED EMBODIMENT

Figure 1A:
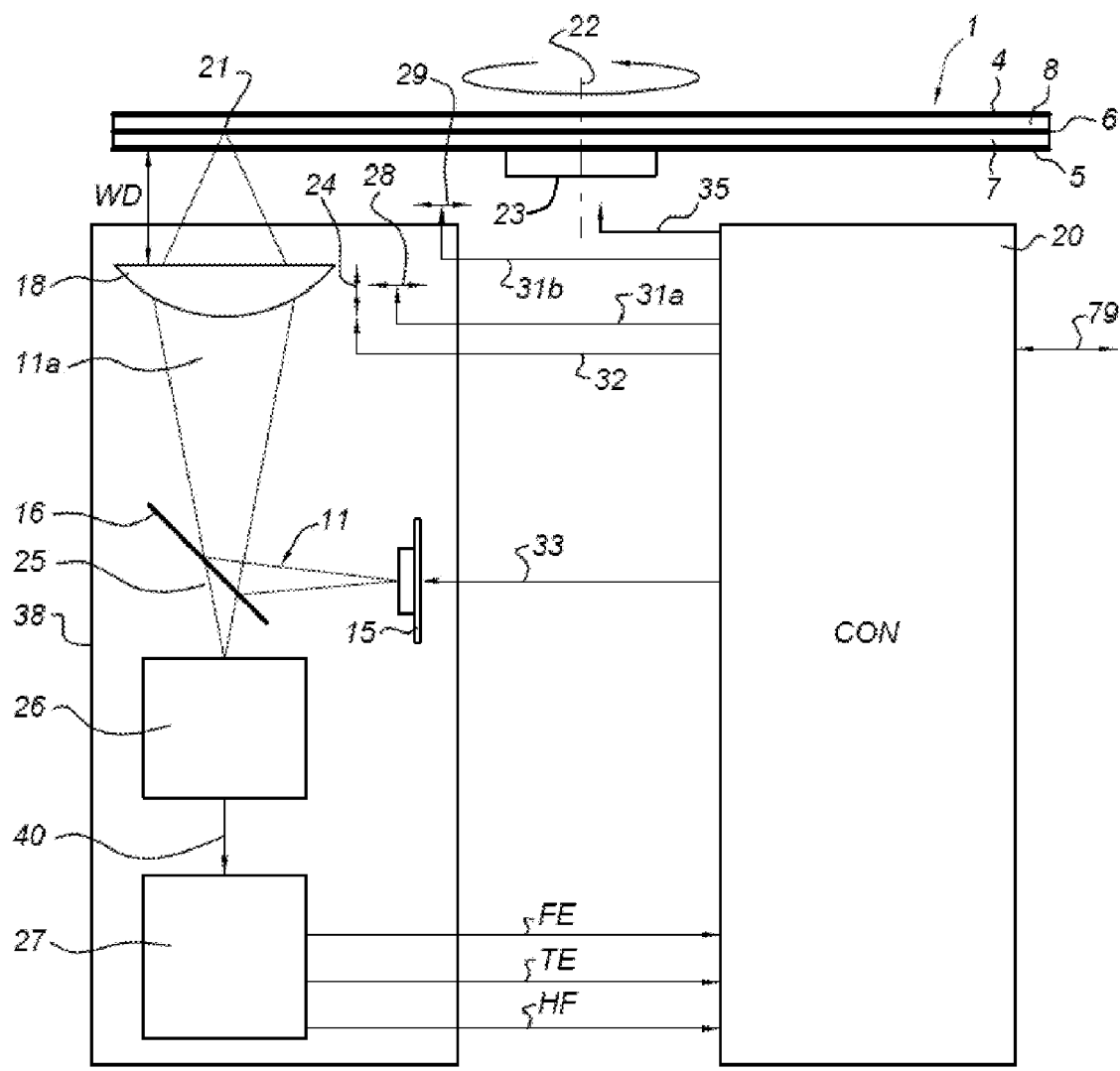
FIG. 1a schematically shows an optical disk drive and an optical disk.

FIG. 1a shows an optical disk drive. An optical disk 1 rotates about an axis 22 operated by a motor 23. An optical source 15, here shown as a laser diode 15, generates an incident optical beam 11, which is directed onto the optical disk via a beam splitter 16, and an objective lens 18. The beam splitter 16 steers the beam over a 90 degree angle. The incident beam 11a, is focused by the objective lens 18 into a focussing spot 21 on the optical disk 1. A focus actuator 24 can move the objective lens 18 parallel to its optical axis, i.e., in a direction perpendicular to the disk surface away to or towards the optical disk, to change the depth of the position of the focussing spot 21. A tracking actuator 28 can move the objective lens 18 in the radial direction of the optical disk, to rapidly follow the track on the optical disk 1. The optical disk drive may further comprise a spherical aberration correction actuator (not shown), capable of applying a correction to the incident beam to compensate for a difference in spherical aberration originating from a substrate thickness (or for BD, cover layer thickness) being different from its nominal value. Likewise, a difference in spherical aberration originating from a spacer layer can also be compensated for when focussing on the different layers of a multi-layer disk. The entire optical system is fitted onto a single support so as to constitute an integrally moveable optical head 38. The movement of the optical head is performed by a head motor 29. A control unit 20 controls the actuators 24, 28 and 29 to keep the optimal position for the objective lens while the disk is rotating. The optical disk reflects the incident beam. The reflected beam 25 is separated from the incident beam by the beam splitter 16. An astigmatic lens (not drawn) may be positioned in the reflected beam to shape the reflected beam 25. The reflected beam is detected by a sensor 26 generating a sensor signal 40. The sensor signal 40 is passed to a pre-processing circuit 27.

The optical disk 1 has an information layer 6, sandwiched between a transparent substrate 7 and a back cover 8. The optical disk 1 is arranged to be accessed with an optical disk drive from a front side 5 through the transparent substrate 7. The back cover 8 is covered with a label on its outer surface 4. The information layer 6 comprises a substantially circular track (not shown). The track is typically a spiraling track with a substantially constant track pitch. The track may comprise a plurality of substantially concentric tracks. For a read-only type optical disk, the track comprises e.g. a plurality of embossed pits and spaces with a plurality of pit lengths and space lengths, associated with data on the optical disk. For a writable type optical disk, the track serves as a guidance when writing a plurality of marks and spaces with a plurality of mark and space lengths associated with data into the information layer 6 and may e.g. also serve as a guidance when reading back the data. The track may additionally comprise disk information data, e.g. coded in a wobble of the track of in additional embossed pits in the track or in between two revolutions of the track.

Figure 1B:
FIG. 1b shows a dual-layer optical disk.

As shown in FIG. 1b, the optical disk 1 may further have a second information layer 9, spaced by a spacer layer 10, from the information layer 6.

Figure 2:
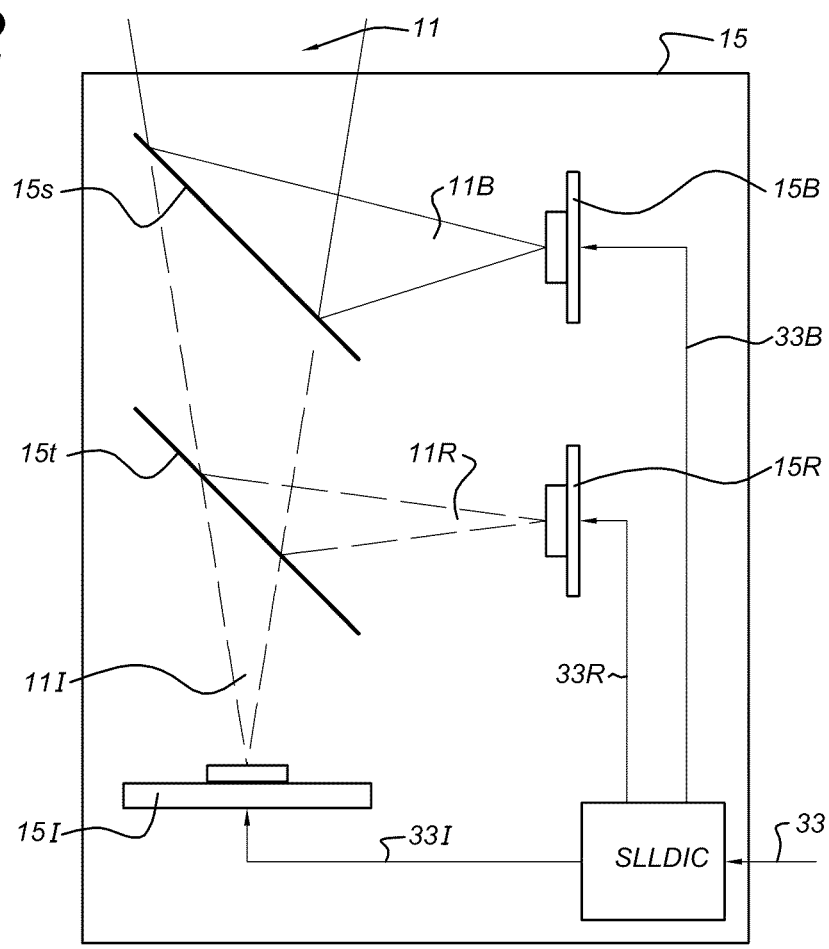
FIG. 2 schematically shows an optical source comprising a plurality of laser diodes of three different colors.

FIG. 2 schematically shows an optical source 15 comprising a plurality of laser diodes 15B, 15R, 15I of three different colors, each associated with one or more specific generations of optical disks. Laser diode 15B generates, during use, a blue beam 11B with a wavelength of approximately 405 nm and is primarily intended for use with BD disks. Laser diode 15R generates, during use, a red beam 11R with a wavelength in the range of 630-690 nm and is primarily intended for use with DVD disks. Laser diode 15I generates, during use, an infrared beam 11I with a wavelength in the range of 780-820 nm and is primarily intended for use with CD disks.

The beams 11B, 11R and 11I are directed with wavelength-sensitive mirrors 15S and 15T to generate the incident beam 11.

This optical source comprises a local laser driver controller SLLDIC, arranged to receive laser driver control signals 33 and to operate the laser diodes 15B, 15R, 15I.

It will be appreciated that the objective lens 18 may comprise a plurality of objective lenses, e.g. a first objective lens with an NA of 0.40-0.52 for use with laser diode 15I, in particular for reading and/or writing CD disks, a second objective lens with an NA of 0.60-0.67 for use with laser diode 15R, in particular for reading and/or writing DVD disks, and a third objective lens with a NA of 0.80-0.85 for use with laser diode 15B, in particular for reading and/or writing BD disks. Alternatively, the a plurality of objective lenses may e.g. comprise a first objective lens for use with laser diode 15I and laser diode 15R and a second, high-NA, objective lens for use with laser diode 15B. When the optical disk drive accommodates a plurality of objective lenses, all objective lenses may be rigidly connected in a single actuator body controlled by the focus actuator 24. The objective lenses may e.g. be arranged side-by-side, substantially parallel to the optical disk, in the actuator body.

Figure 3:
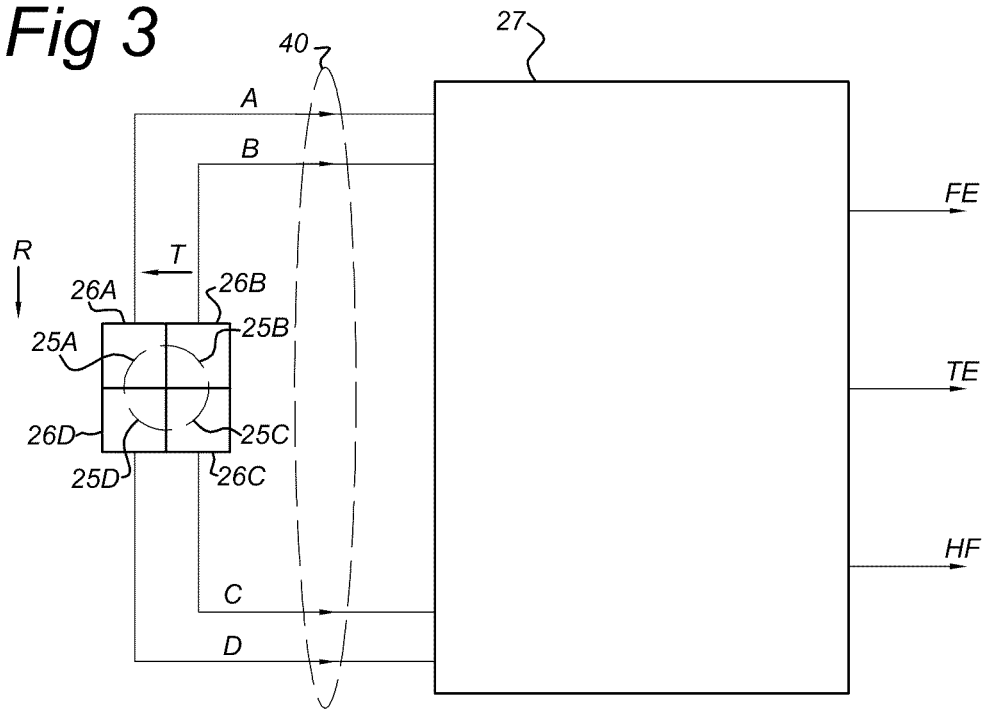
FIG. 3 schematically shows a signal processing unit of an optical disk drive.

As is shown in detail in FIG. 3, the sensor 26 may be a quadruple photodetector 26, having four sensor segments 26A-26D for sensing the intensities of four portions of the reflected beam 25. The sensor signal comprises four channels, A-D, one for each sensor segment, which are provided to a pre-processing unit 27. The arrow R represents the relation between the beam portions and the radial direction of the optical disk 1 and the arrow T represents the relation between the beam portions and the tangential direction of the optical disk 1. I.e., sensor 26A and 26B detect intensities corresponding to the inner upper and inner lower quarters respectively of spot 21 as reflected by the optical disk 1, and sensor 26C and 26D detect intensities corresponding to the outer lower and outer upper quarters respectively of spot 21 as reflected by the optical disk 1. The pre-processing unit 27 processes the intensity signals A-D generated by the sensor segments 26A-26D so as to produce a focus error signal FE, a tracking error signal TE and a central aperture signal HF. The central aperture signal HF is produced as the sum of all the intensity signals. When using an astigmatic focussing method, the focus error signal FE is derived as $FE=(A+C)-(B+D)$. The tracking error signal TE may be a radial push-pull signal PP, derived from the intensity signals as $PP=(A+B)-(C+D)$. The central aperture signal HF may also be referred to as the data signal. The error signal may be of this form, but may also be normalized, with a normalized radial push-pull signal $NPP=((A+B)-(C+D))/(A+B+C+D)$ and a normalized focus error signal NFE=

((A−B)/(A+B))+((C−D)/(C+D)). Another focussing method may alternatively be used, such as the spot-size method or the Foucault method, with a corresponding focus error signal FE. The tracking error signal TE may alternatively be e.g. a so-called Differential Phase Detection signal DPD, e.g. for radial tracking on a ROM disk when the information layer has embossed marks, e.g. with DVD-ROM disks. The Differential Phase Detection signal may be produced from a phase difference between the sum signal of signal A and C and the sum signal of signal B and D. This phase difference may be expressed as DPD=phase(A+C)−phase(B+D).

Figure 4:
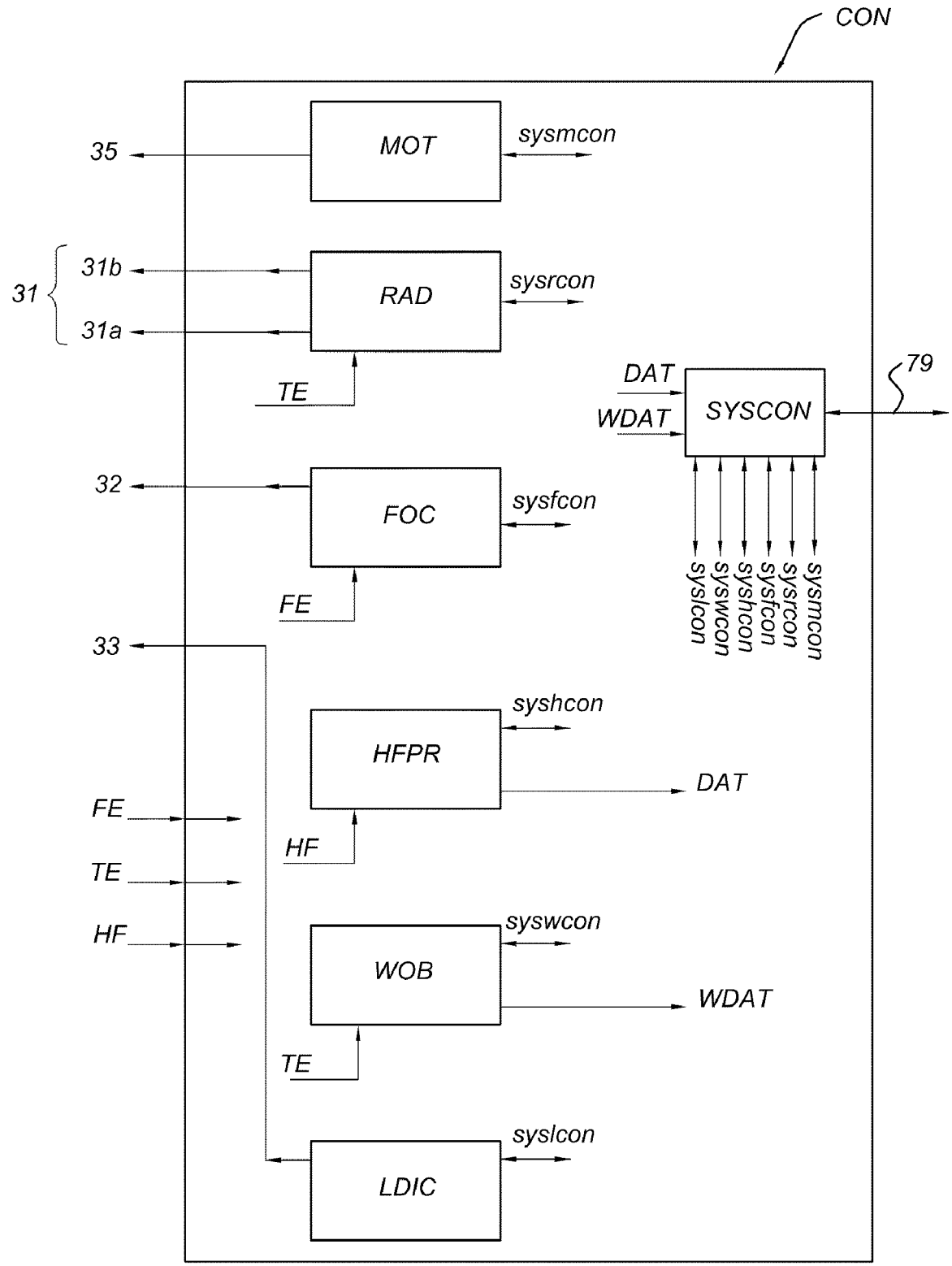
FIG. 4 schematically shows a controller of an optical disk drive.

FIG. 4 shows a control unit CON of the optical disk drive. The control unit CON may include one or several microprocessors or digital signal processors. The control unit CON is responsible for several control tasks. The tasks can be executed in the control unit itself, or in an external processor cooperating with the control unit.

The tracking error signal TE is passed to a radial tracking controller RAD. Arrows 31a and 31b denote the capability of the radial tracking controller RAD to control the tracking actuator 28 and the head motor 29, so as to drive the radial position of the objective lens 18 and the optical head 38. For this purpose, the tracking controller RAD controls the tracking actuator 28 such that the tracking error signal TE substantially has a predetermined value, also called tracking offset. This tracking offset is usually zero. The radial tracking controller RAD and the tracking actuator 28 may be further referred to as a radial servo system.

The focus error signal FE (or NFE) is passed to a focus controller FOC. Arrow 32 represents the capability of the focus controller FOC to control the focus actuator 24, so as to keep the focussing spot 21 focussed at the correct depth corresponding to the position of the information layer 6. For this purpose, the focus controller FOC controls the focus actuator 24 such that the focus error signal has a predetermined value, also called focus offset. The focus controller and the focus actuator 24 may be further referred to as a focus servo system.

The data signal HF may be passed to a data recovery mechanism HFPR. The data recovery mechanism HFPR retrieves the data as recorded with the marks and spaces on the recordable optical disk 1, or as present as embossed pits and spaces on a ROM disk. The processing of the data signal HF and the further processing of the recovered data will not be further described here.

Arrow 33 denotes the capability of a laser driver controller LDIC to control the laser diode 15, for example to control the intensity of the incident beam 11. The LDIC may be physically located inside the controller CON, but may alternatively be located on the optical head 38 close to the laser diode 15. When the source 15 comprises a plurality of laser diodes 15I, 15R, 15B, the LDIC is arranged to control the local laser driver controller SLLDIC. In an alternative embodiment, the LDIC includes the functionality of the local laser driver controller SLLDIC, and directly drives each of the plurality of laser diodes 15I, 15R, 15B.

Arrow 35 denotes the capability of a disk motor controller MOT to control the motor 23. A speed of the motor 23 may be adjusted, e.g., to scan the optical disk 1 with a well-defined linear speed or a well-defined angular speed.

Optionally, the tracking error signal TE is also passed to a wobble processor WOB, in particular when the tracking error signal TE is a radial push-pull signal PP. When scanning the track of an optical disk with a wobble, the amplitude radial push-pull signal PP shows a variation as a function of time as a result of the wobble on the disk. This variation is also commonly referred to as the wobble signal. The wobble processor WOB may generate a digital wobble data signal WDAT from the wobble signal. The digital wobble data signal WDAT may further be processed by a digital processor SYSCON, in order to retrieve so-called wobble data coded in the wobble. The wobble data may, e.g., comprise the physical address of the location on the disk, standard write strategy information such as laser power and timing parameters for writing marks, and disk information such as the disk manufacturer. The use of the wobble data will not be further described here.

The digital processor SYSCON may also provide and monitor information, such as control settings, via control lines SYSHCON, SYSRCON, SYSFCON, SYSLCON, SYSWCON, SYSMCON to and from the data recovery mechanism HFPR, the radial tracking controller RAD, the focus controller FOC, the laser driver controller LDIC, the wobble processor WOB and the disk motor controller MOT. The focus controller FOC may, e.g., receive a focus offset value via control line SYSFCON in order to apply a focus offset to the focus actuator and hence to move the objective lens towards or away from the disk. The digital processor SYSCON may also interface via 79 to external components, e.g., a host computer in which the optical disk drive is mounted.

The control unit CON may be arranged for aiming to scan the track 3 on the optical disk 1 with an optimal quality of the spot 21. For this purpose, the digital processor SYSCON can, e.g., retrieve a measurement value of push-pull signal amplitude from the radial tracking controller RAD, a measurement value of jitter from the data recovery mechanism HFPR, and a measurement value of wobble amplitude from the wobble processor WOB. By comparing a selection of these measurement values as a function of one or more operating parameters of the various controllers, the digital processor SYSCON may generate optimal values for the operating parameters.

The control unit CON may also comprise a memory unit (not drawn) or cooperate with an external memory device (not drawn), to store and retrieve e.g. control settings, measurement values, values for the operating parameters, one or more tables comprising information related to disk classes, disk types, disk information, write strategies, etc.

FIG. 5a-FIG. 5c schematically show cross sections of optical disks 1C, 1D, 1B of the three different disk families, CD, DVD and BD, and associated incident beams and objective lens positions for a first optical disk drive with an optical pickup unit according to a first design.

FIG. 5a shows a cross section of a CD disk 1C. A recording layer or information layer 6C is embossed in a substrate 7C. The substrate has a thickness SCD of 1.1-1.2 mm. The recording layer 6C is covered with a protective cover layer 8C, which is covered with a label on its outer surface. The infrared incident beam is focussed with objective lens 18C through the substrate on the recording layer 6C with an NA of 0.40-0.52 when the objective lens 18C is positioned at working distance WDC from the front surface 5C of the optical disk 1C.

FIG. 5b shows a cross section of a DVD disk 1D. A recording layer or information layer 6D is embossed in a substrate 7D. The substrate has a thickness SDVD of approximately 0.6 mm. The recording layer 6D is covered with a protective layer 8D, which may be covered with a label. The protective layer 8D may also be another 0.6 mm substrate, either with or without another recording layer back-to-back with recording layer 6D. The red incident beam is focussed with objective lens 18D through the substrate on the recording layer 6D with a spot 21D with a NA of 0.60-0.67 when the objective lens 18D is positioned at working distance WDD from the front surface 5D of the optical disk 1D.

FIG. 5c shows a cross section of a BD disk 1B. In the example shown, a recording layer or information layer 6B is embossed in a thin substrate 7B. The thin substrate has a thickness SBD of approximately 0.100 mm. The recording layer 6B is attached to a carrier substrate 8B with a thickness of approximately 1.1 mm. The blue incident beam is focussed with objective lens 18B through the thin substrate 7B on the recording layer 6B with a spot 21B with a NA of 0.80-0.85 when the objective lens 18B is positioned at working distance WDB from the front surface 5B of the optical disk 1B. In an alternative BD disk, the recording layer 6B is embossed in the carrier substrate 8B and the thin substrate 7B is a plastic layer laminated onto the carrier substrate 8B at the side of the recording layer 6B.

Different optical disk drives may employ different optical designs of light paths from the laser diode(s) to the optical disk 1. The table below shows examples of the working distances WDC, WDD and WDB for a plurality of optical designs OPU-A, OPU-B, OPU-C and OPU-D.

|       | BD disk    | DVD-disk    | CD-disk    |          |
|-------|------------|-------------|------------|----------|
| OPU-A | WDB = 665  | WDD = 445   | WDC = 155  | Working  |
| OPU-B | WDB = 360  | WDD = 1250  | WDC = 890  | Distance |
| OPU-C | WDB = 360  | WDD = 840   | WDC = 610  | WD (μm)  |
| OPU-D | WDB = 500  | WDD = 1260  | WDC = 900  |          |

Aspects of the invention will be described below with reference to several different designs. It will be appreciated that it is dependent on the optical design of the light path what aspect can be optimally used in an optical disk drive with a specific design.

The thickness of the substrate 7C, 7D, 7B (FIG. 5a-FIG. 5c) through which the information layer 6, 9, 6C, 6D, 6B is accessed with the incident beam 11 may approximately be determined by monitoring the focus error signal FE and/or the central aperture signal HF together with the drive signal 32 of the focus actuator 24. The drive signal level of the drive signal 24 is a measure of the distance that the objective lens is moved towards or away from the disk. When the objective lens 18 is moved from a distant position towards the disk by varying the drive signal level, the focus error signal FE and/or the central aperture signal HF may show the presence of the interface between air and the substrate 7C, 7D, 7B, then the interface between the substrate 7 and the information layer 6, 6C, 6D, 6B. When the disk is a two-layer disk, the second information layer 9 is also detected. As each different substrate thickness, i.e., each different depth of the information layer, is associated with a specific drive signal level, the substrate thickness may be estimated from the drive signal level at which the presence of the information layer 6, 9 is detected. The thickness of the substrate 7 may be used in determining the disk type, as it discriminates between the 1.2 mm disk types (CD), the 0.6 mm disk types (DVD) and the 0.1 mm disk types (BD).

In prior art methods in optical disk drives with a plurality of laser diodes 15I, 15R, 15B, determining the substrate thickness is performed in a sequence of measurements. A first measurement is used to test whether the substrate thickness corresponds to a first disk type according to a first standard. The first measurement uses a first laser diode of the plurality of laser diodes and a first NA of the objective lens, the first laser diode and the first NA associated with the first disk standard, e.g. the infrared laser diode 15I and an NA of e.g. 0.50 for determining whether the optical disk 1 has a substrate thickness of 1.1-1.2 mm associated with the CD-disk type. When the first measurement determines that the substrate thickness corresponds to the first disk type, the sequence of measurements is terminated and the method concludes with the substrate thickness corresponds to the first disk type. When the first measurement determines that the substrate thickness does not correspond to the first disk type, the sequence of measurements is continued with a second measurement to test whether the substrate thickness corresponds to a second disk type according to a second standard. The second measurement uses a second laser diode of the plurality of laser diodes and a second NA of the objective lens, the second laser diode and the second NA associated with the second disk standard, e.g. the red laser diode 15R and an NA of e.g. 0.65 for determining whether the optical disk 1 has a substrate thickness of approximately 0.6 mm associated with the DVD-disk type. When the second measurement determines that the substrate thickness corresponds to the second disk type, the sequence of measurements is terminated and the method concludes with the substrate thickness corresponds to the second disk type. When the second measurement determines that the substrate thickness does not correspond to the second disk type, the sequence of measurements is continued with a third measurement to test whether the substrate thickness corresponds to a third disk type according to a third standard. The third measurement uses a third laser diode of the plurality of laser diodes and a third NA of the objective lens, the third laser diode and the third NA associated with the third disk standard, e.g. the blue-violet laser diode 15B and an NA of e.g. 0.85 for determining whether the optical disk 1 has a substrate thickness of approximately 0.1 mm associated with the BD-disk type.

Each of the first, second and third measurement comprises analyzing, during movement of the objective lens(es), the focus error signal FE and/or the central aperture signal HF for a first signal characteristic corresponding to a presence of the interface between air and the substrate 7C, 7D, 7B, also referred to as a front reflection, and then analyzing the focus error signal FE and/or the central aperture signal HF for a second signal characteristic corresponding to a presence of the information layer 6, 6C, 6D, 6B. The focus error signal FE may e.g. be analysed for an S-curve behaviour associated with a crossing of an interface, i.e. when the spot 21 moves along the focus axis and crosses the interface. The central aperture signal HF may e.g. be analysed for a reflection peak associated with a crossing of an interface.

Figure 6A:
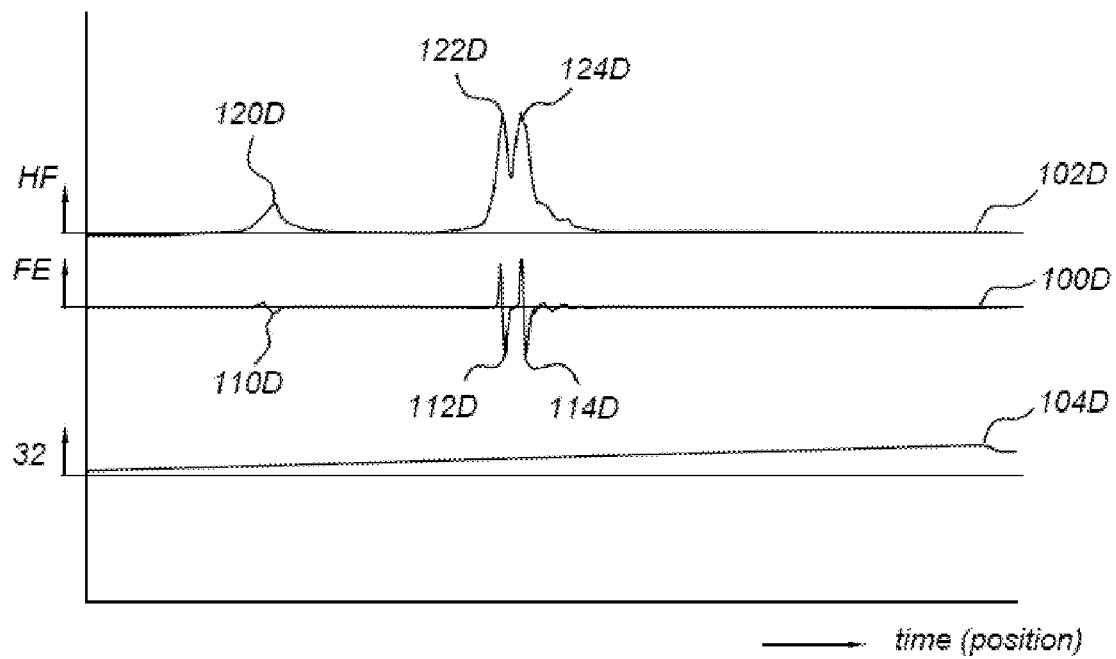

An example is shown in FIG. 6a, showing a signal trace 100D of the focus error signal FE, a signal trace 102D of the central aperture signal HF and a signal trace 104D of a ramp signal when moving the objective lens 18D with an NA of 0.65 along the focus axis towards a DVD disk using the red laser diode 15R, wherein the movement is controlled by the ramp signal. The focus error signal 100D shows a first S-curve 110D corresponding to the front reflection of the front surface 5D and two further S-curves 112D, 114D associated with the first and the second information layer 6D, 9D of a dual-layer DVD-disk. The central aperture signal 102D shows a first peak 120D corresponding to the front reflection of the front surface 5D and two further peaks 122D, 124D associated with the first and the second information layer 6D, 9D of a dual-layer DVD-disk.

Figure 6B:
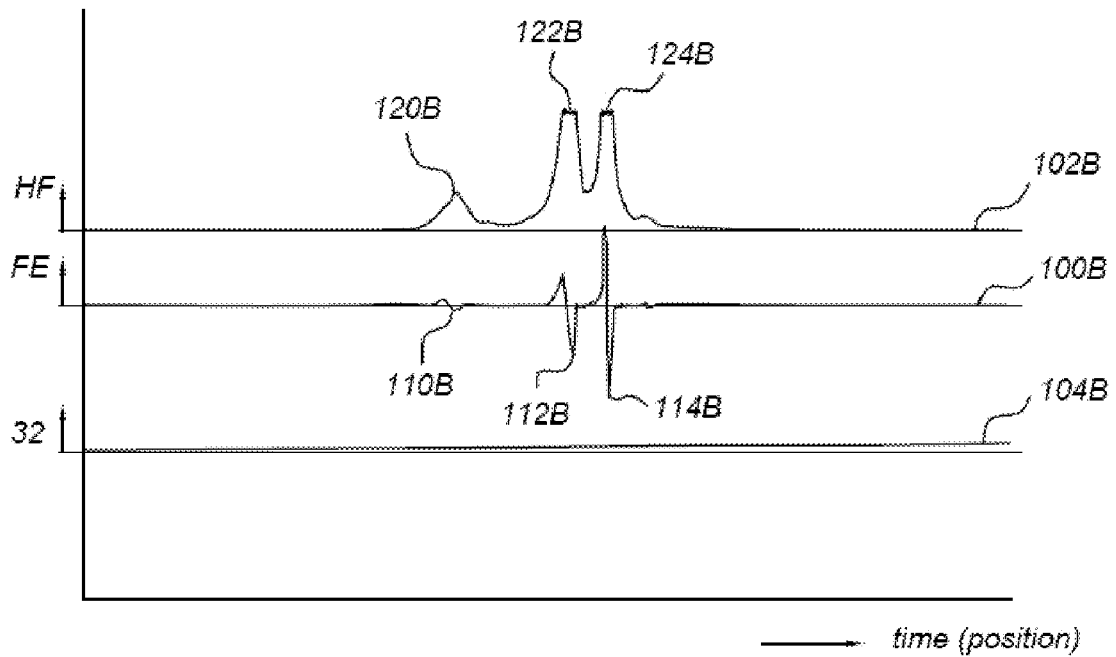

A further examples is shown in FIG. 6b, showing a signal trace 100B of the focus error signal FE, a signal trace 102B of the central aperture signal HF and a signal trace 104B of a ramp signal when moving the objective lens with an NA of 0.85 along the focus axis towards a BD disk using the blue-violet laser diode 15B. The focus error signal 100B shows a first S-curve 110B corresponding to the front reflection of the front surface 5B and two further S-curves 112B, 114B associated with the first and the second information layer 6B, 9B of a dual-layer BD-disk. The central aperture 102B shows a first peak 120B corresponding to the front reflection of the front surface 5B and two further peaks 122B, 124B associated with the first and the second information layer 6B, 9B of a dual-layer BD-disk.

As each of the first, second and third measurement comprises a movement of the objective lens(es) 18, the complete sequence of measurement may consume a considerable time. It is an object of the invention to provide a method, and an optical disk drive arranged to use the method, allowing to determine the substrate thickness of the optical disk 1 within a single movement of the objective lens from a distant position towards the optical disk 1.

When trying to use a single laser diode, e.g. the red laser diode 15R, and a single NA, e.g. an NA of 0.65, for determining the substrate thickness from detecting the first S-curve associated with the front reflection and at least one further S-curve associated with at least one information layer may have a problem in that the first S-curve and the second S-curve may not be individually visible for each of the possible substrate thicknesses in the focus error signal. E.g., trace 100F in FIG. 6c shows the focus error signal when using a red laser 15R and an NA of 0.65 with a BD-type disk in a prior art optical disk drive: only one, distorted, S-curve 110F is visible during the movement of the objective lens along the focus axis while crossing the front surface 5B as well as the information layer 6B of the BD-disk. Likewise, the first peak corresponding to the front reflection of the front surface and the at least one peak may not be individually visible for each of the possible substrate thicknesses in the central aperture signal. E.g., trace 102F in FIG. 6c shows the central aperture signal HF when using a red laser 15R and an NA of 0.65 with a BD-type disk in a prior art optical disk drive: only one, broad, peak 120F is visible during the movement of the objective lens along the focus axis while crossing the front surface 5B as well as the information layer 6B of the BD-disk. A similar distorted S-curve and broadened single peak arise when using an infrared laser 15I and an NA of 0.50 with a BD-disk. Moreover, when using a blue-violet laser diode 15B and an NA of 0.85, the substrate thickness of a CD-disk is too large for the blue spot to ever see the information layer 6C of the CD-disk: the objective lens may come in contact with the optical disk 1 before the information layer 6C is detected.

According to first aspect of the invention, one laser diode, e.g. laser diode 15D, is selected from the plurality of laser diodes 15I, 15D, 15B. Optionally, an NA is selected, e.g. from selecting an objective lens from a plurality of objective lenses 18C, 18D, 18B. The NA may correspond to a disk standard associated with the selected laser diode. During the movement of the objective lens along the focus axis, the central aperture signal HF is analysed for the presence of a reflection peak 120D, 120F. As an example, FIG. 7a and FIG. 7b show again the same curves as FIG. 6c and FIG. 6a, associated with moving spot 21D using a red laser diode 15R and an objective lens 18D with an NA of 0.65 with a BD-disk 1B and a DVD-disk 1D respectively.

FIG. 7a corresponds to the situation wherein the optical disk 1 is a BD-type disk 1B. FIG. 7a shows again trace 102F of the central aperture signal with the broad reflection peak 120F. The width 140W of the reflection peak 120F may be determined from determining a first position P1 associated with the central aperture signal 102F crossing a first threshold 130 in an upward direction, i.e. when the central aperture signal has increased above the first threshold 130, and determining a second position P2 associated with the central aperture signal 102F crossing a second threshold 132 in a downward direction, i.e. when the central aperture signal has decreased again below the second threshold 132. In an embodiment, the second threshold 132 is equal to the first threshold 130, as is shown in FIG. 7a. In an alternative embodiment, the second threshold is determined from a peak level of the reflection peak 120F of the central aperture signal 102F during movement of the objective lens 21D along the focus axis after the first position P1 has been reached. The width 140W of the reflection peak 120F is then determined as a difference of the second position P2 and the first position P1. The width 140W of the reflection peak 120F is then compared against at least one reference width for determining whether the width 140W of the reflection peak 120F is within a width range expected from an optical disk having one of a plurality of substrate thicknesses. The at least one reference width may e.g. have a value in between a first width expected for a BD-disk and a second width expected for a DVD-disk.

FIG. 7b corresponds to the situation wherein the optical disk 1 is a DVD-type disk 1D. FIG. 7b shows again trace 102D of the central aperture signal with the broad reflection peak 120D. The width 150W of the reflection peak 120D is determined from determining a first position P1D associated with the central aperture signal 102D crossing the first threshold 130 in an upward direction, i.e. when the central aperture signal has increased above the first threshold 130, and determining a second position P2D associated with the central aperture signal 102D crossing the second threshold 132 in a downward direction, i.e. when the central aperture signal has decreased again below the second threshold 132. In an embodiment, the second threshold 132 is equal to the first threshold 130, as is shown in FIG. 7b. In an alternative embodiment, the second threshold is determined from a peak level of the reflection peak 120D of the central aperture signal 102D during movement of the objective lens 21D along the focus axis after the first position P1D has been reached. The width 150W of the reflection peak 120D is then determined as a difference of the second position P2D and the first position P1D. The width 150W of the reflection peak 120D is then compared against at least one reference width for determining whether the width 150W of the reflection peak 120D is within a width range expected from an optical disk having one of a plurality of substrate thicknesses. The at least one reference width may e.g. have a value in between a first width expected for a BD-disk and a second width expected for a DVD-disk.

According to an embodiment of the invention, the red laser 15R, and the NA of 0.65, is selected from the plurality of laser diodes for determining the width of the reflection peak, and from that the substrate thickness of the optical disk. As an example, the optical disk 1 may then be classified as a BD disk and the substrate thickness may be determined as approximately 0.1 mm if the width of the reflection peak is within a first width range expected from a BD-type disk, e.g. when it is above 1200 arbitrary units (a.u.), whereas the optical disk may be classified as a DVD disk and the substrate thickness may be determined as approximately 0.6 mm if the width of the reflection peak is within a second width range expected from a DVD-type disk, e.g. when it is in between 530 and 1200 a.u., and the optical disk may be classified as a CD disk and the substrate thickness may be determined as approximately 1.1-1.2 mm if the width of the reflection peak is within a third width range expected from a DVD-type disk, e.g. when it is in below 530 a.u. According to an embodiment, the substrate thickness is determined using a single movement of the focus actuator with the objective lens(es).

According to another embodiment of the invention, the red laser 15R and the NA of 0.65 are selected for determining whether the width of the reflection peak is larger than a pre-determined threshold, and the movement is performed towards the optical disk 1. When the width of the reflection peak is larger than a pre-determined threshold, the optical disk 1 may then be classified as a BD disk. As an example, the optical disk 1 may then be classified as a BD disk and the substrate thickness may be determined as approximately 0.1 mm if the width of the reflection peak is above 1200 a.u. When the width of the reflection peak is not above 1200 a.u., the optical disk 1 may then be classified as being of another type than a BD disk type. In an embodiment, the movement is continued while the sensor output signal is analysed for determining the position corresponding to the information layer of the other type, e.g. from the position associated a second reflection peak in the central aperture signal and/or a second S-curve in the focus error signal.

The method according to the first aspect may also be used in optical disk drives with a single laser 15 and a single objective lens 18 with a single NA, e.g. in a DVD-only optical disk drive that is capable of writing and/or reading DVD-type disk but cannot write and/or read data onto/from a BD-type disk. Using the red laser 15R and the NA of 0.65 of the DVD-only optical disk drive may allows to detect whether an inserted optical disk is of an non-supported type. E.g. by determining width of the reflection peak to be larger than a pre-determined threshold, e.g. larger than 1000 arbitrary units, the method can detect that the inserted optical disk is of a non-supported type. An inserted BD-disk may then be rejected by the method and by the optical disk drive. This rejection may be achieved significantly faster than in prior art optical disk drives, which e.g. perform a plurality of trial-and-error attempts to scan the disk.

It will be appreciated that using the width of the reflection peak for determining the substrate thickness according to the first aspect of the invention may also be used when a plurality of movements is used, e.g. one with a BD-lightpath, one with a DVD-lightpath and one with a CD-lightpath.

Figure 8A:
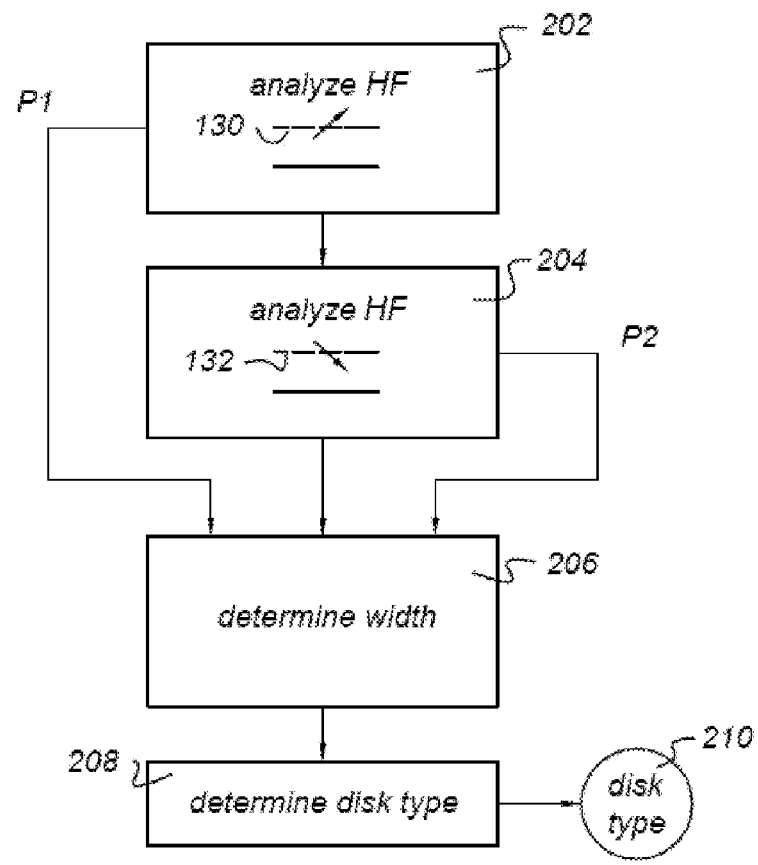
FIG. 8a-FIG. 8b schematically show exemplary embodiments of a method according to the first aspect of the invention.
Figure 8B:
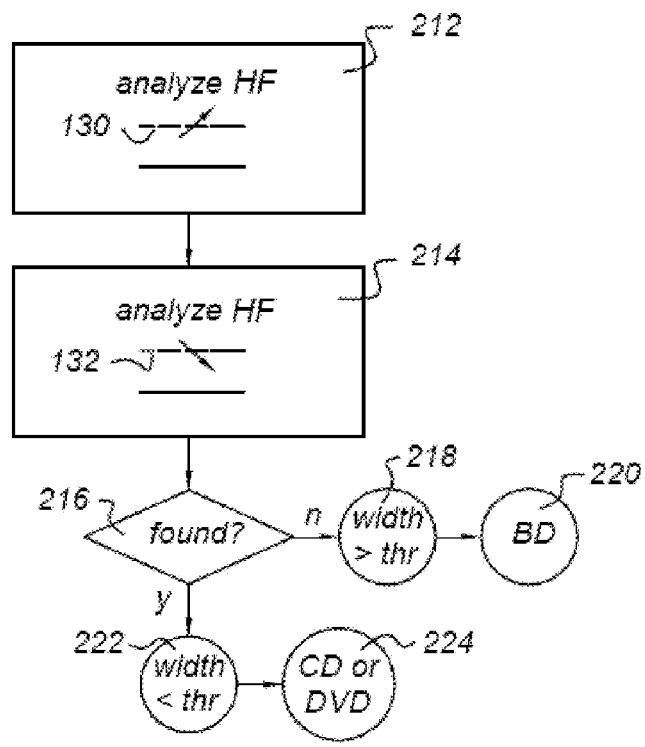

FIG. 8a-FIG. 8b schematically show exemplary embodiments of a method according to the first aspect of the invention.

The method may be applied during the movement of the focus actuator from the first actuator position towards the second actuator position, while either the DVD-lightpath or the CD-lightpath is selected. Alternatively, the sensor output signal is acquired during the movement of the focus actuator from the first actuator position towards the second actuator position, and the method is applied after the movement has completed, the method being applied on the sensor output signal as acquired.

FIG. 8a schematically shows an exemplary embodiment of a method according to the first aspect of the invention.

In a first block 202, the central aperture signal HF is analysed for determining the first position P1 where the central aperture signal HF crosses a first threshold 130 in an upward direction, i.e. where the central aperture signal has increased above the first threshold 130.

Then, in a second block 204, the central aperture signal HF is analysed for determining the second position P2 where the central aperture signal HF crosses a second threshold 132 in a downward direction, i.e. where the central aperture signal has decreased again below the second threshold 132.

Block 206 then determines the width of the front reflection from the second position P2 and the first position P1.

Block 208 then determines the disk type of the optical disk from the width of the front reflection, e.g. by comparing the width of the front reflection with each of a plurality of ranges corresponding to a plurality of disk types.

FIG. 8b schematically shows another exemplary embodiment of a method according to the first aspect of the invention.

In a first block 212, the central aperture signal HF is analysed for determining the first position P1 where the central aperture signal HF crosses a first threshold 130 in an upward direction, i.e. where the central aperture signal has increased above the first threshold 130.

Then, in a second block 214, the central aperture signal HF is analysed for determining the second position P2 where the central aperture signal HF crosses a second threshold 132 in a downward direction, i.e. where the central aperture signal has decreased again below the second threshold 132, within a pre-determined displacement relative to the first position P1.

Block 216 then determines whether the aperture signal has decreased below the second threshold 132 within the pre-determined displacement relative to the first position P1. If not, the method proceeds to block 218 and determines that the width of the front reflection, although not measured quantitatively, is typical for a BD-type disk, and the method concludes in block 220 with the optical disk type being determined as a BD-type disk corresponding to a substrate thickness of substantially 0.1 mm.

When block 214 determined that the aperture signal did decrease below the second threshold 132 within the pre-determined displacement relative to the first position P1, block 222 determines that the width of the front reflection is too small to originate from a BD-type disk, and block 224 concludes that the optical disk 1 thus belongs to the group of disk types comprising a CD-type disk and a DVD-type disk, but excluding a BD-type disk.

Figure 9:
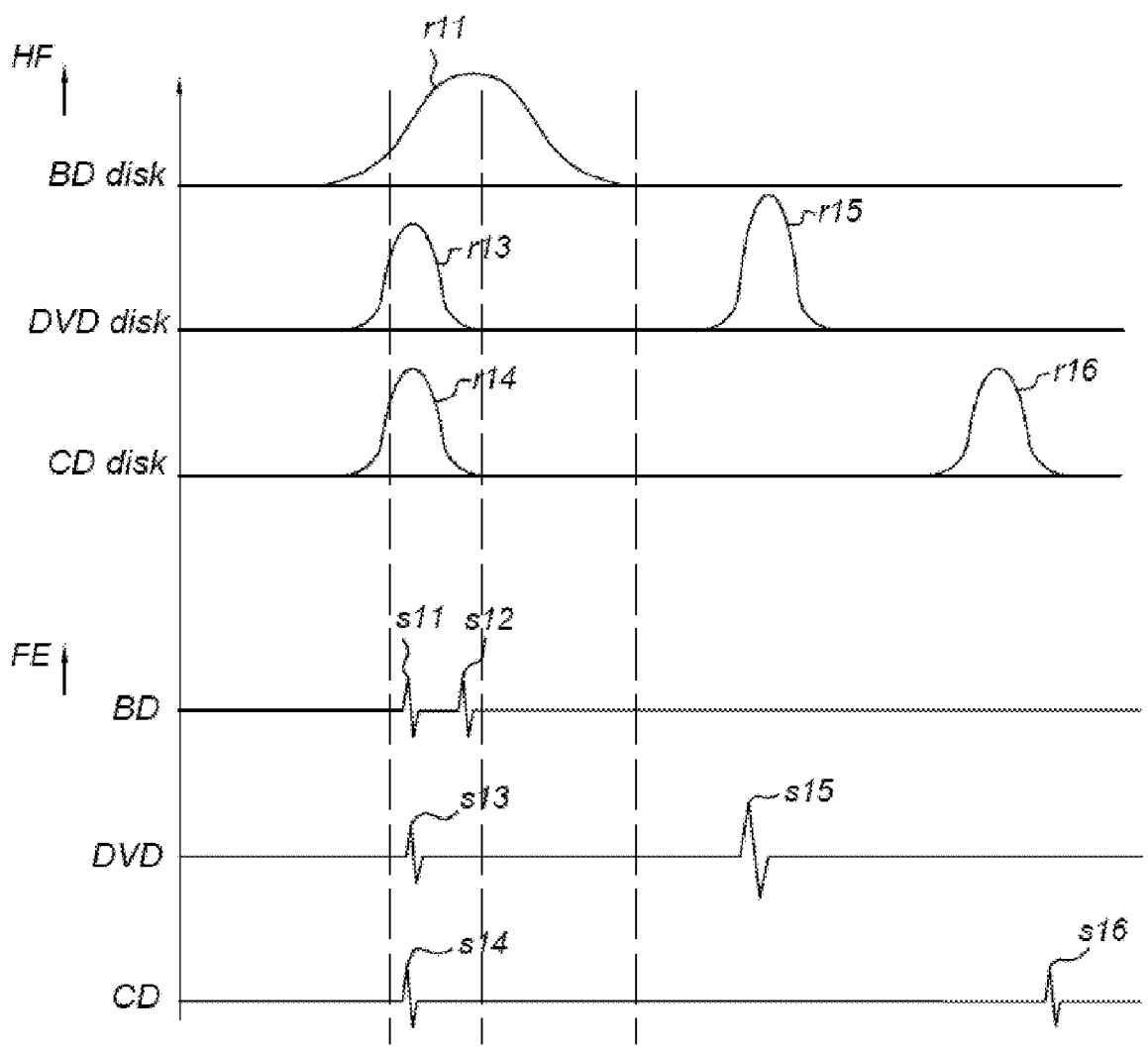
FIG. 9 shows signal traces for clarifying another exemplary embodiment, schematically shown in FIG. 10, of a method according to the first aspect of the invention.
Figure 10:
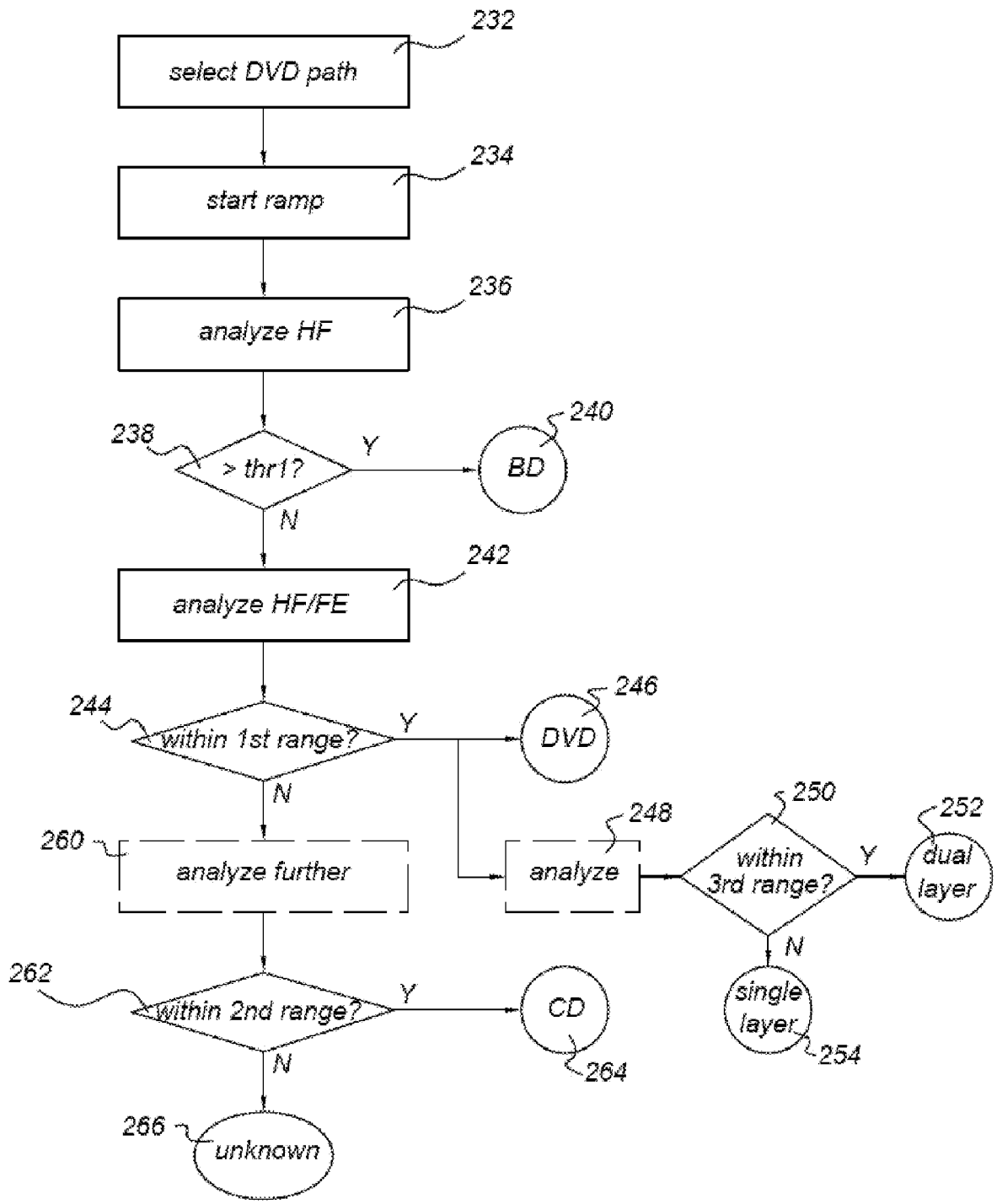
FIG. 10 schematically shows the exemplary embodiment of a method according to the first aspect of the invention.

FIGS. 9 and 10 are used to schematically describe another exemplary embodiment of a method according to the first aspect of the invention.

FIG. 9 schematically show the central aperture signal HF and the focus error signal FE while the focus actuator is moved from a start position away from the optical disk (corresponding to the left end of the curves) towards the optical disk 1, using a DVD-lightpath, i.e. with a spot 21D from laser diode 15R with an objective lens 18D with an NA of 0.65.

The first trace shows the central aperture signal when the optical disk is a BD-type disk with a substrate thickness of 0.1 mm. Reflection peak r11 corresponds to the spot 21D approaching the front surface 5B of the optical disk 1B, crossing the front surface 5B, approaching the information layer 6B and crossing the information layer 6B, similar to the peak 120F shown in FIG. 6c and FIG. 7a.

The second trace shows the central aperture signal when the optical disk is a DVD-type disk with a substrate thickness of 0.6 mm. Reflection peak r13 corresponds to the spot 21D approaching and crossing the front surface 5D of the optical disk 1D. Reflection peak r15 corresponds to the spot 21D approaching and crossing the information layer 6D.

The third trace shows the central aperture signal when the optical disk is a CD-type disk with a substrate thickness of 1.1-1.2 mm. Reflection peak r14 corresponds to the spot 21D approaching and crossing the front surface 5C of the optical disk 1C Reflection peak r16 corresponds to the spot 21D approaching and crossing the information layer 6C.

The fourth trace shows the focus error signal FE when the disk is a BD-type disk with a substrate thickness of 0.1 mm. The distorted S-curve s11 corresponds to the spot 21D substantially focused on the front surface 5B of the optical disk 1B. S-curve s12 corresponds to the spot being substantially focused on the information layer 6B of the BD-type disk 1B.

The fifth trace shows the focus error signal FE when the disk is a DVD-type disk with a substrate thickness of 0.6 mm. S-curve s13 corresponds to the spot 21D being substantially focused on the front surface 5D of the DVD-disk 1D. S-curve s15 corresponds to the spot being substantially focused on the information layer 6D of the DVD-disk 1D.

The sixth trace shows the focus error signal FE when the disk is a CD-type disk with a substrate thickness of 1.1-1.2 mm. S-curve s14 corresponds to the spot 21D being substantially focused on the front surface 5C of the CD-disk 1C. S-curve s16 corresponds to the spot 21D being substantially focused on the information layer 6C of the CD-disk 1C.

FIG. 10 schematically shows the exemplary embodiment using the optical pickup unit of a second design, associated with the signals shown in FIG. 9.

In block 232, the DVD-lightpath is selected, i.e. laser diode 15R and an objective lens 18D with an NA of 0.65 are selected for producing a spot 21D.

After the DVD-lightpath is selected, the movement of the focus actuator is started from the start actuator position in block 234.

In block 236, the front reflection is analysed according to e.g. one of the embodiments described with reference to FIG. 8a, block 202-block 206, or described with reference to FIG. 8b, block 212-block 214.

In block 238, it is determined whether the width of the central aperture signal is larger than a pre-determined width and thus indicating that the optical disk 1 is either a BD-type disk, or another type. When the width of the central aperture signal is larger than the pre-determined width, as with reflection peak r13 of the first curve of FIG. 9, the method concludes with block 240 and classifies the optical disk to be a BD-type disk with a substrate thickness of 0.1 mm. When the width of the central aperture signal is smaller than the pre-determined width, the reflection peak corresponds to peak r13 or r14 of the second and third curve of FIG. 9, and the method continues to block 242 for analysing the sensor output signal during the continued movement for the presence of data layer signals, i.e. a further reflection peak r15 and/or S-curve s15, within a first pre-determined distance from the position associated with peak r13 or r14. When the further reflection peak r15 and/or S-curve s15 is found at a second position within the first pre-determined distance in block 244, the method continues to block 246 and concludes that the optical disk 1D is a DVD-type disk. The method may then continue with analysing the sensor output signal during the continued movement for the presence of a further data layer signal in block 248, i.e. another reflection peak and/or S-curve, corresponding to a second data layer in the optical disk 1. Block 250 determines whether such data layer signal is found within a further pre-determined distance from the second position. If so, the method continues to block 252 and concludes that the optical disk 1D is a dual-layer DVD-type disk with at least two data layers 6 and 9. If not, the method continues to block 254 and concludes that the optical disk 1D is a single-layer DVD-type disk with a single data layer 6.

When no further reflection peak r15 and/or S-curve s15 is found within the first pre-determined distance in block 244, the method continues to block 260 with analysing the sensor output signal during the continued movement for the presence of a data layer signal in block 260. Block 262 determines whether such data layer signal is found within a second pre-determined distance from the first position (corresponding to the front surface 5C). If so, the method concludes in block 264 that the optical disk 1C is a CD-type disk. If not, the method concludes in block 266 that the optical disk 1 is of an unknown type. In an alternative embodiments, the method directly proceeds to block 264 from block 244 when no further reflection peak r15 and/or S-curve s15 is found within the first pre-determined distance.

The optical design of a second optical disk drive may deviate from the optical design of the optical disk drives used in the description of the above embodiments, e.g. in that the sensor of the second optical disk drive may e.g. produce less pronounced differences in the width of the reflection peaks between the three disk types, and hence discriminate less clearly between them. Moreover, the optical design of the second optical disk drive may be such that reflection peaks in the central aperture signal and/or S-curves in the focus error signal are better separated than in the first optical disk drive.

Figure 11:
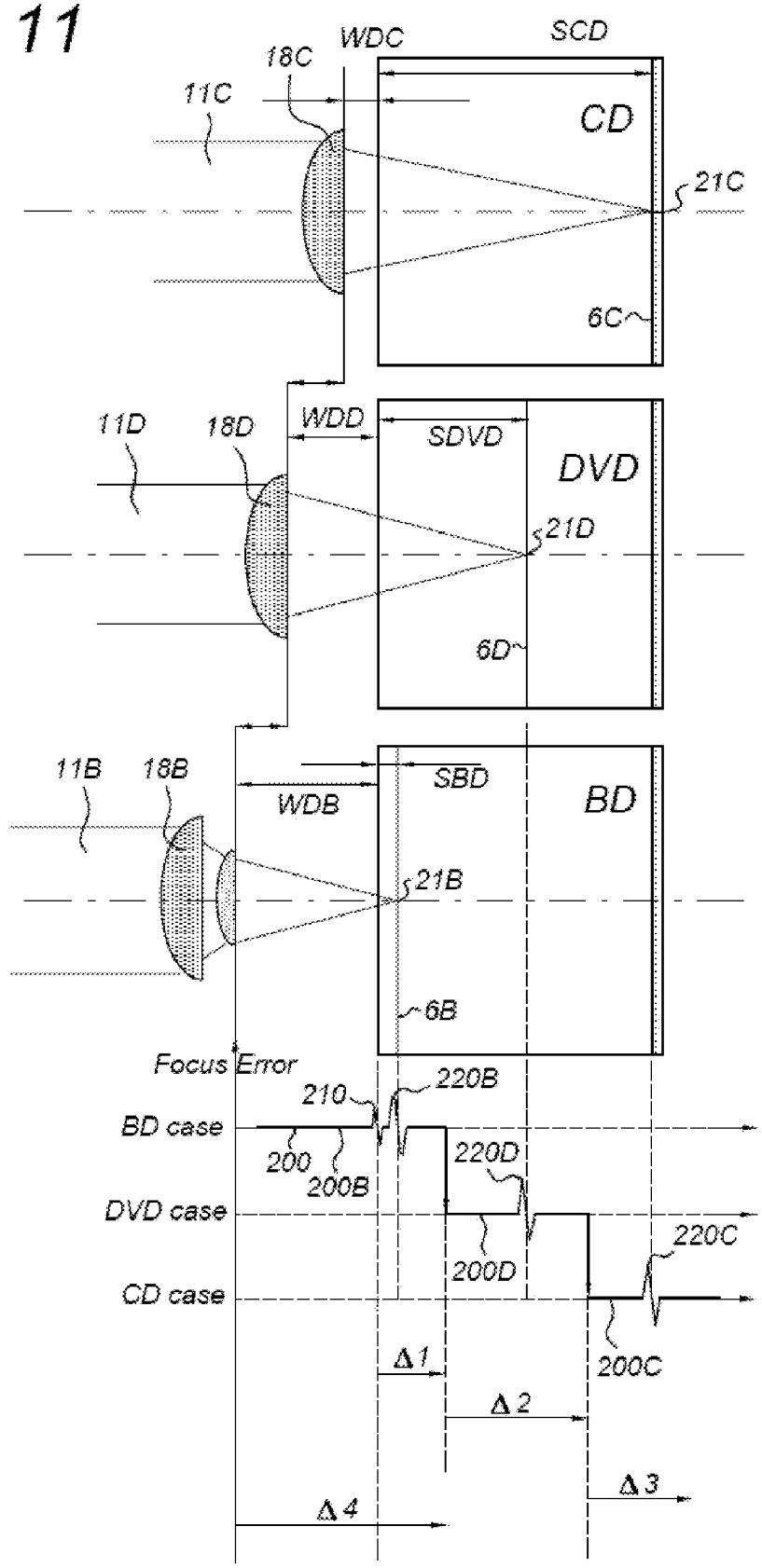
FIG. 11 and FIG. 12 show exemplary embodiments of a method according to the second aspect of the invention.

A second aspect of the invention is illustrated using a first exemplary embodiment with reference to FIG. 11. The exemplary embodiment uses OPU-A described above, with the working distance WDB being approximately 665 µm, the working distance WDD being approximately 445 µm and the working distance WDC being approximately 155 µm, wherein the mentioned working distances relate to the situation that the spot 21 is focused on the information layer 6 of the optical disk 1. FIG. 11 shows a signal trace 200 of a focus error signal FE. According to the first exemplary embodiment of the second aspect of the invention, a first laser diode is selected from the plurality of laser diodes, e.g. in this example the blue-violet laser diode 15B. Optionally, a corresponding NA is selected, e.g. from selecting the corresponding objective lens from a plurality of objective lenses. During the movement of the objective lens along the focus axis, the sensor output signal is analysed for a first signal characteristic associated with the spot being substantially focussed at the front surface 5 of the optical disk 1, while using the first laser diode. In this example, analyzing the sensor output signal comprises analyzing the focus error signal FE. The first signal characteristic may e.g. be an S-curve 210 in the focus error signal, a reflection peak in a central aperture signal, or a leading edge of a broad reflection peak (as in FIG. 7a or FIG. 7b). After the front surface 5 is detected, the movement is continued over at most a first pre-determined further distance Δ1 and analysed for the presence of a second signal characteristic associated with the spot being substantially focussed at an information layer 6 of the optical disk 1. The second signal characteristic may e.g. be an S-curve 220B in the focus error signal FE, a reflection peak in a central aperture signal, or a trailing edge of a broad reflection peak. When the optical disk 1 is of a first disk type with a first substrate thickness, e.g. when it is a BD-disk, the information layer 6B will be detected within the movement over the first pre-determined further distance Δ1, and the substrate thickness of the optical disk 1 is thus determined as approximately 0.1 mm. When no second signal characteristic is found within the movement over the first pre-determined further distance Δ1, a second laser diode is selected from the plurality of laser diodes, in this example the red laser diode 15R. The movement is continued over at most a second pre-determined further distance Δ2 and analysed for the presence of a second signal characteristic 220D associated with the spot being substantially focussed at an information layer 6 of the optical disk 1, while using the second laser diode. When the optical disk 1 is of a second disk type with a second substrate thickness, e.g. when it is a DVD-disk, the information layer 6D will be detected within the movement over the second pre-determined further distance Δ2, and the substrate thickness of the disk is thus determined as approximately 0.6 mm. When no second signal characteristic is found within the movement over the second pre-determined further distance Δ2, a third laser diode is selected from the plurality of laser diodes, in this example the infrared laser 15I. The movement is continued over at most a third pre-determined further distance Δ3 and analysed for the presence of a second signal characteristic 220C associated with the spot being substantially focussed at an information layer 6 of the optical disk 1, while using the third laser diode. When the optical disk 1 is of a third disk type with a third substrate thickness, e.g. when it is a CD-disk, the information layer 6C will be detected within the movement over the third pre-determined further distance $\Delta 3$, and the substrate thickness of the disk is thus determined as approximately 1.1-1.2 mm. When no second signal characteristic is found within the movement over the third pre-determined further distance, the disk is rejected as being of an unknown type.

It will be appreciated that the first, second and third pre-determined further distances $\Delta 1$, $\Delta 2$, $\Delta 3$ are determined from margin distances between focus actuator positions associated with working distances WDB, WDD, WDC of the objective lens(es) 18B, 18R, 18C, the margin distance between two focus actuator positions being defined by a difference between the working distance when focussing the spot on a layer interface of a first disk type and the working distance when focussing the spot on a corresponding layer interface of a second disk type, with the layer interface being e.g. the information layer 6 or the front surface 5 of the optical disk 1. E.g., with OPU-A, the margin distance of $\Delta$BD-DVD equals 220 μm (between WDB and WDD) and the margin distance of $\Delta$DVD-CD equals 330 μm (between WDD and WDC). The order of selecting the first, second and third laser as well as the discriminating quality if the method are dependent on the working distances and the margin distances. The method may thus be specifically well suited for optical disk drives with relatively large margin distances.

In an alternative embodiment, the selection is changed from the first laser diode to a further laser diode from the plurality of laser diode after the front surface 5 is detected, and the movement is continued over at most the first pre-determined further distance $\Delta 1$ and analysed for the presence of a second signal characteristic 220B using the further laser diode. In an example, the first laser diode may e.g. be the red laser 15R, the further laser diode may be the blue-violet laser 15B and the second laser diode may be the red laser 15R again. In this alternative embodiment, when no second signal characteristic is found within the movement over the first pre-determined further distance $\Delta 1$ with the further laser diode, the second laser diode is selected from the plurality of laser diodes. Hence, in this alternative embodiment, the front surface 5 is detected with the first laser diode and selection of the laser diode is subsequently switched, whereas the embodiment described above only switches the selection of the laser after the movement has been continued over the first pre-determined further distance $\Delta 1$ without detecting the presence of the information layer 6.

In another alternative embodiment, the selection is changed from the first laser diode to a further laser diode from the plurality of laser diode after the front surface 5 is detected or when the objective lens has moved along the focus axis over a pre-determined distance $\Delta 4$ (indicated in FIG. 11) from the start position, whatever of the two conditions has been reached earlier. I.e., when no front surface 5 is detected within the movement over the pre-determined distance $\Delta 4$, the selection is changed. The movement is then continued and analysed for the presence of the first signal characteristic 210 using the further laser diode. Hence, in this other alternative embodiment, when the front surface 5 is not detected with the first laser diode within the pre-determined distance $\Delta 4$ from the start position, the selection of the laser diode is subsequently switched for detecting the front surface with the further laser diode.

It will be appreciated that the method can also be implemented in "reverse" order, i.e. starting at a start position very close to the disk and moving the objective lens(es) away from the optical disk 1, while changing the selection of the laser diode depending on the presence/absence of an S-curve in the focus error signal FE and/or reflection peak in the central aperture signal HF and the distance over which the objective lens(es) have moved.

It will be appreciated that selectively choosing the laser diode for detecting the front surface and the information layer may allow to choose the laser diode that provides well-separated reflection peaks in the central aperture signal of the front surface and the information layer. In that case, the blue-violet laser diode 15B may be selected as the first laser diode and used for detecting the front surface 5 of the optical disk 1, and to determine whether the optical disk 1 has a substrate thickness of approximately 0.1 mm using still the blue-violet laser diode 15B. When the optical disk 1 is indeed a BD disk with a substrate thickness of approximately 0.1 mm, this will positively identify the optical disk a such using the blue-violet laser 15B, which clearly resolves the front surface 5B and the information layer 6B of a BD-disk. Hence, there is no need to use a measurement of the width of the reflection peak for determining the substrate thickness as described in reference with FIG. 7a and FIG. 7b. However, it will be understood that the measurement of the width of the reflection peak may also be used in embodiments of the second aspect of the invention; it will allow to alternatively use the red laser 15R, or the infrared laser 15I, also for correctly determining the substrate thickness, also when the optical disk 1 is a BD-disk. This is illustrated using a second exemplary embodiment of the second aspect with reference to FIG. 12 and FIG. 13.

Figure 12:
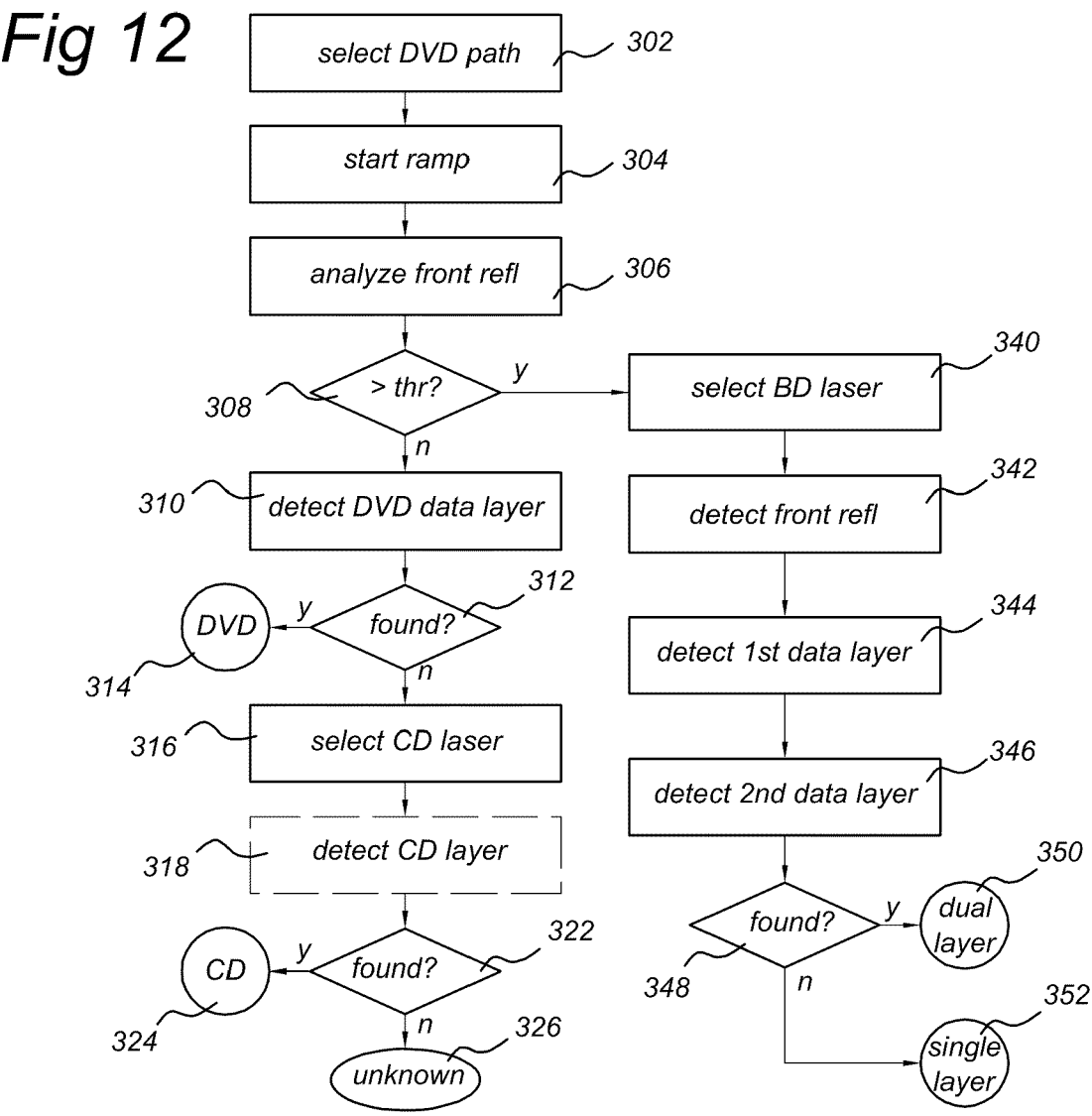
Figure 13:
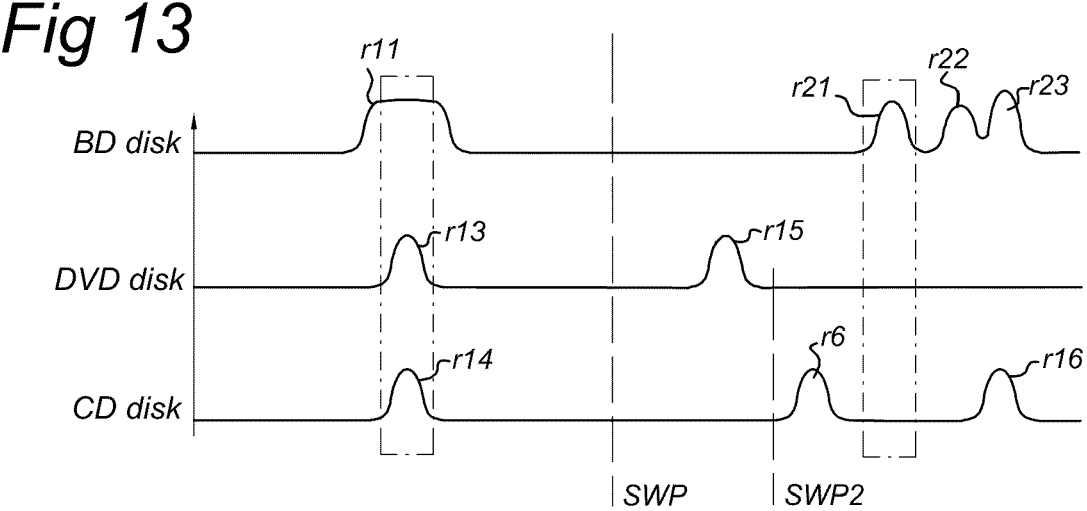
FIG. 13 shows signal traces for clarifying the exemplary embodiment, schematically shown in FIG. 12.

The method according to the second exemplary embodiment of the second aspect is schematically shown in FIG. 12 and FIG. 13. The method starts with selecting the DVD light path, i.e. the red laser 15R and an NA of 0.65, in block 302. The movement of the focus actuator from the start position away from the optical disk 1 towards the end position is started in block 304. The central aperture signal is then analyzed for determining a width of the front reflection as described in reference with FIG. 7a and FIG. 7b. In block 308, it is determined whether the width of the front reflection is larger than a pre-determined threshold. When the optical disk 1 is a BD-type disk, the width of the front reflection r11 will be larger than the pre-determined threshold, as is shown in the upper trace of FIG. 13, and the proceeds to block 340, wherein the blue-violet laser diode 15B and corresponding NA of 0.85 are selected at position SWP shown in FIG. 13. Position SWP may be a position after central aperture signal HF has dropped below the threshold 132 and the width of the front reflection has quantitatively be determined, but may alternatively correspond to a position within the front reflection peak r11 when the actuator has moved over a pre-determined distance from the position P1 where the central aperture signal HF crossed the first threshold 130, the pre-determined distance corresponding to the maximum width of the front reflection as expected for DVD-type and CD-type disks. When the optical disk 1 is a DVD-type disk or a CD-type disk, the width of the front reflection, r13 for DVD or r14 for CD, will be smaller than the pre-determined threshold, as is shown in the upper trace of FIG. 13, and the proceeds to block 310, still using the red laser 15R and NA of 0.65.

After block 340, wherein the selection of the laser has changed from the red laser 15R to the blue-violet laser diode 15B and corresponding NA of 0.85, the central aperture signal is analysed for determining whether the spot 21B crosses the front surface 5B of the BD-type disk 1B in block 342, and to detect a reflection peak r21 shown in the upper trace of FIG. 13 after some further movement. The method will then proceed to block 344, for detecting another reflection peak r22 associated with a data layer 6B of the optical disk 1B. The difference between the focus actuator positions associated with reflection peak r21 and r22 may then be determined and it may be checked whether this difference is consistent with a substrate thickness of approximately 0.1 mm as is required for a BD-type disk. In further embodiments, the method proceeds to block 346 for detecting the position of a second data layer during the continued movement. Block 348 determines whether a second data layer has been found within a maximum possible displacement possible according to BD-disk type standards. If so, the method proceeds to block 350 for concluding that the optical disk 1B is a dual-layer BD-type disk. If not, the method proceeds to block 352 for concluding that the optical disk 1B is a single-layer BD-type disk In block 310, the movement is continued still using the red laser 15R and NA of 0.65 for detecting whether a next reflection peak associated with a data layer is found within a pre-determined distance from the reflection peak r13, r14. When the next reflection peak is found within the pre-determined distance, the reflection peak r15 originates from a DVD-type disk, as is shown in the middle trace of FIG. 13, and block 314 concludes that the optical disk 1D is a DVD-type disk associated with a substrate thickness of approximately 0.6 mm. When no next reflection peak is found within the pre-determined distance, the method may continue to block 324 and concludes that the optical disk 1C is a CD-type disk associated with a substrate thickness of approximately 1.1-1.2 mm. The method may alternatively continue from block 314 to block 316, wherein the infrared laser 15I and corresponding NA of 0.50 are selected at position SWP2, and then to block 318 for analysing the central aperture signal HF for a reflection peak r6 as shown in the lower trace of FIG. 13. Block 322 determined whether the reflection peak r6 is found before the focus actuator has reached the end actuator position. If so, the method proceeds to block 324 and concludes that the optical disk 1C is a CD-type disk associated with a substrate thickness of approximately 1.1-1.2 mm. If not, the method proceeds to block 326 and concludes that the optical disk 1 is of an unknown type.

Alternatively of changing the selection of the light path from the DVD-lightpath to the CD-lightpath at position SWP2 in block 316, the method may proceed with keeping the DVD-lightpath and analysing the central aperture signal HF for a reflection peak r16 as shown in the lower trace of FIG. 13, reflection peak r16 being associated with a red spot 21R substantially being focused on the information layer 6C of a CD-type optical disk 1C. Then, the method determines next whether the reflection peak r16 is found before the focus actuator has reached the end actuator position. If so, the method concludes that the optical disk 1C is a CD-type disk associated with a substrate thickness of approximately 1.1-1.2 mm. If not, the method concludes that the optical disk 1 is of an unknown type.

In an optical disk drive with at least one relatively small margin distance, the method according as described with reference to FIG. 11 may not always be sufficiently robust. An alternative method will be described using an exemplary embodiment of a further embodiment of the second aspect with reference to FIG. 14a, FIG. 14b, FIG. 14c and FIG. 15. The description of the exemplary embodiment uses OPU-C, with the working distance WDB being approximately 360 μm, the working distance WDD being approximately 840 μm and the working distance WDC being approximately 610 μm wherein the mentioned working distances relate to the situation that the spot 21 is focused on the information layer 6 of the optical disk 1.

Figure 14A:
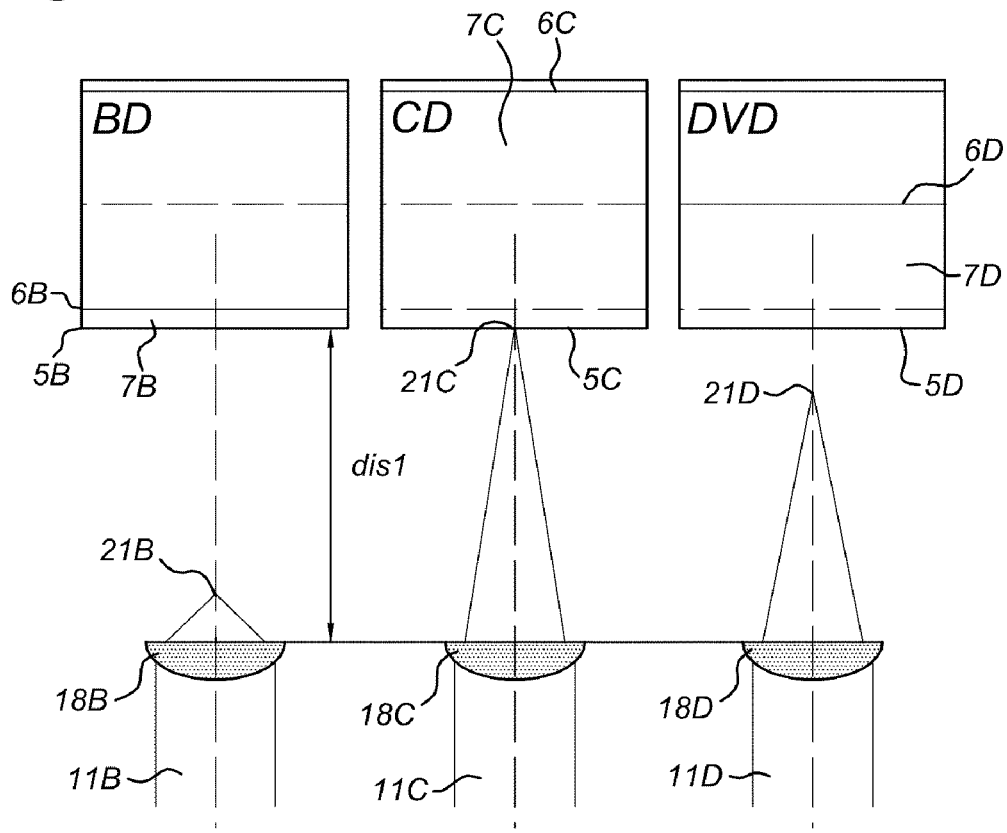
FIG. 14a-FIG. 14c schematically show CD-, DVD- and BD-type optical disks, and associated incident beams and objective lens positions, each at a different position of the focus actuator.
Figure 14B:
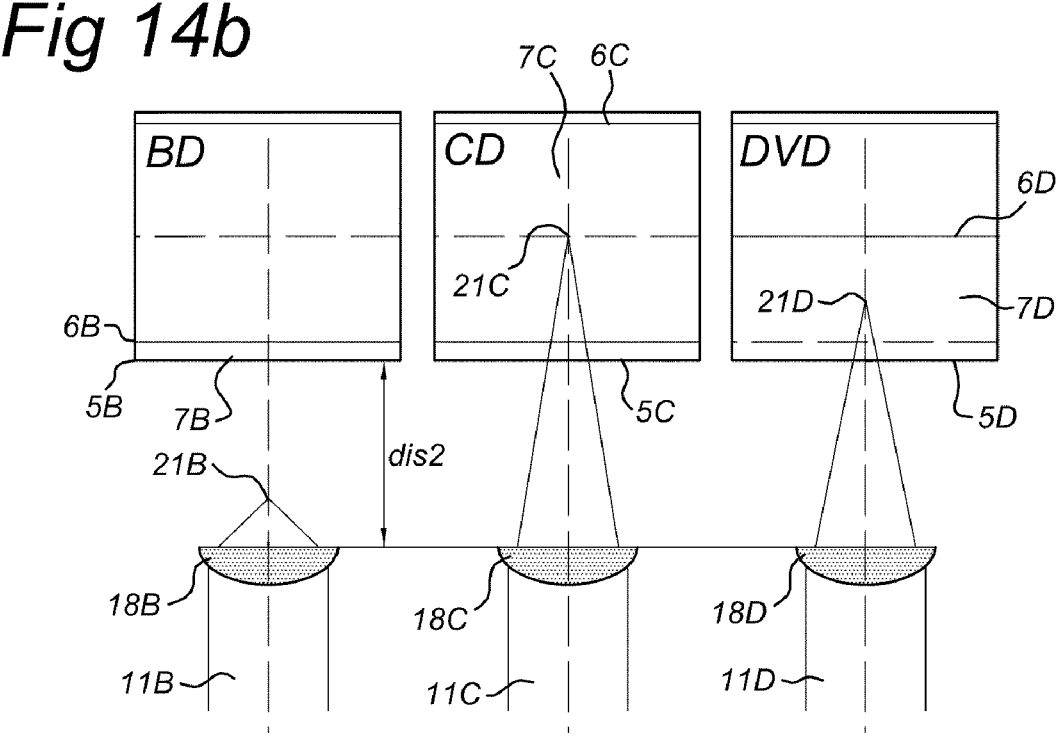
Figure 14C:
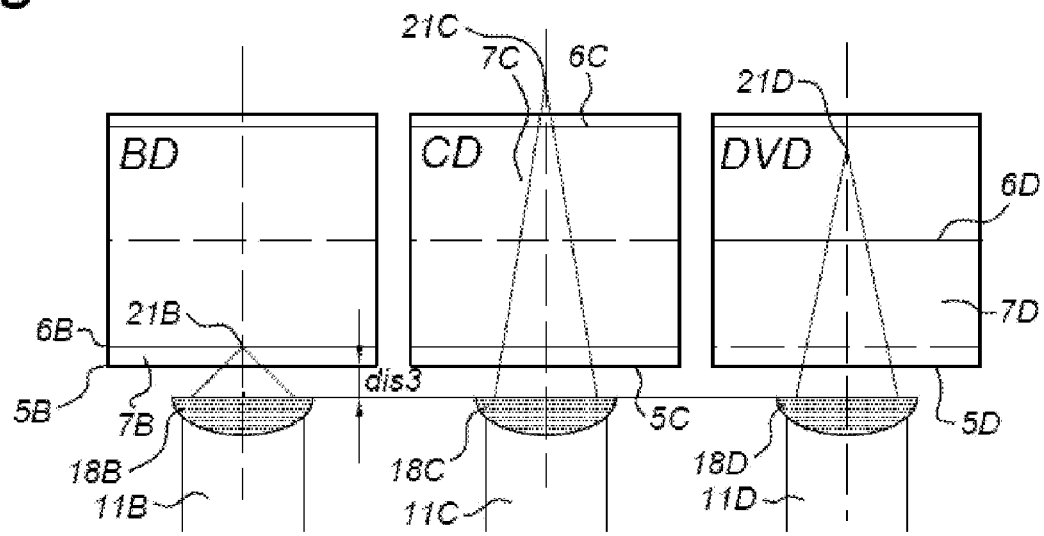

FIG. 14a-FIG. 14c each schematically shows three situations. In each of the figures, the left situation shows an objective lens 18B focusing an incident beam 11B generated from a blue-violet laser diode 15B into spot 21B when the focus actuator is positioned with the objective lens 18B at a distance from the front surface 5B of a BD-disk, having an information layer 6B at a substrate thickness of approximately 0.1 mm. The middle situation shows an objective lens 18C focusing an incident beam 11C generated from the infrared laser diode 15I into spot 21C when the focus actuator is positioned with the objective lens 18C at a distance from the front surface 5C of a CD-disk having an information layer 6C at a substrate thickness of approximately 1.1-1.2 mm. The right situation shows an objective lens 18D focusing an incident beam 11D generated from the red laser diode 15R into spot 21D when the focus actuator is positioned with the objective lens 18D at a distance from the front surface 5D of a DVD-disk having an information layer 6D at a substrate thickness of approximately 0.6 mm.

When moving the focus actuator with the objective lens(es) 18B, 18C, 18D from a start position towards the optical disk, the situation of FIG. 14a will be achieved first: the focus actuator with the objective lens(es) 18B, 18C, 18D is positioned at a distance dis1 from the front surface 5 of the optical disk 1. In this position, spot 21C will be focused on the front surface of the optical disk 1. However, spot 21B and 21D would not focus on the optical disk 1 as is shown in the left and right figure. When the movement continues, at some moment spot 21D will be focused on the front surface of the optical disk 1. When the movement continues further, at some moment the situation of FIG. 14b will be achieved, wherein the focus actuator with the objective lens(es) 18B, 18C, 18D is positioned at a distance dis2 from the front surface 5 of the optical disk 1. In this position, spot 21C will be substantially focused on the information layer 6D of the optical disk 1 when the optical disk 1 is a DVD-type disk having the information layer 6D at the substrate thickness of approximately 0.6 mm, and a reflection peak may be visible in the central aperture signal HF and/or an S-curve may be visible in the focus error signal FE. However, when the optical disk 1 is a CD-type disk with a substrate thickness of approximately 1.1-1.2 mm, spot 21C will be focused somewhere approximately in the middle of the substrate 7, such that the central aperture signal HF will be small and the focus error signal FE will not show an S-curve around this position of the spot 21C with the CD-type disk. Also, when the optical disk 1 is a BD-type disk with a substrate thickness of approximately 0.1 mm, spot 21C will be focused "behind" information layer 6B, such that the central aperture signal HF will be small and the focus error signal FE will not show an S-curve around this position of the spot 21C with the BD-type disk. When the movement continues further, at some further moment the situation of FIG. 14c will be achieved, wherein the focus actuator with the objective lens(es) 18B, 18C, 18D is positioned at a distance dis3, corresponding to working distance WDB, from the front surface 5 of the optical disk 1. In this position, spot 21B will be substantially focused on the information layer 6B of the optical disk 1 when the optical disk 1 is a BD-type disk having the information layer 6B at the substrate thickness of approximately 0.1 mm, as is shown in the left figure, and a reflection peak may be visible in the central aperture signal HF and/or an S-curve may be visible in the focus error signal FE. However, when the optical disk 1 is a CD-type disk or a DVD-type disk, spot 21 will be focused "behind" front surface 5C or 5D respectively, such that the central aperture signal HF will be small and the focus error signal FE will not show an S-curve around this position of the spot 21B with the CD-type or DVD-type disk. Likewise, spot 21C and spot 21D will not be focused on either the front surface 5C, 5D or the information layer 6C, 6D either, as is shown in the middle and the right figure.

The inventors have realized that detecting the sensor output signal and analyzing for the presence of an S-curve in the focus error signal FE and/or the presence of a reflection peak in the central aperture signal HF while moving the focus actuator with the objective lens(es) while changing the selection of the laser diode 15I, 15R, 15B with a high-frequency allows to analyze for the presence of S-curves and/or reflection peaks effectively with each of the spots 21C, 21D, 21B. The inventors have realized that the order and approximately positions of the S-curves and/or reflection peaks as thus obtained are characteristic for the specific disk type of the optical disk 1 in the optical disk drive. For this purpose, the selection of the laser diode is switched at a relatively high frequency during the movement towards the optical disk 1. The focus error signal FE and/or the central aperture signal HF are acquired during the movement. As an example, the laser selection may e.g. switch at a frequency of at least 132 kHz between the blue-violet laser 15B, the red laser 15R and the infrared laser 15I, the preprocessor 27 may acquire the sensor output signal at e.g. a corresponding sample frequency of 132 kHz, and the main processor CON may e.g. de-multiplex the resulting stream of sample into three channels at 44 kHz each. These three channels may be referred to as a BD-laser channel for sensor output signal samples acquired with the blue-violet laser 15B and an NA of 0.85, as a DVD-laser channel for sensor output signal samples acquired with the red laser 15R and an NA of 0.65, and as a CD-laser channel for sensor output signal samples acquired with the infrared laser 15I and an NA of 0.50. Alternatively, the main processor CON may receive the sensor output signal as a single channel, and, optionally, record the selected laser corresponding with each sample with the sample in the single channel.

Figure 15:
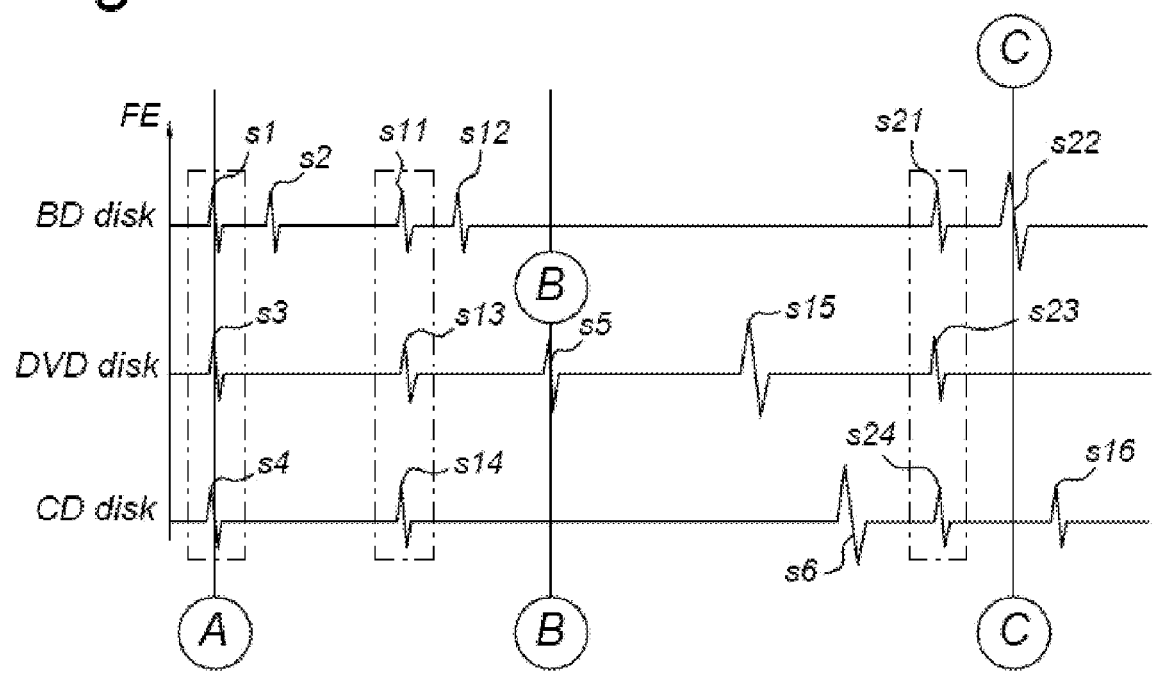
FIG. 15 shows signal traces for clarifying a further embodiment of the second aspect of the invention.

As an example, FIG. 15 schematically shows the focus error signal FE during the movement towards the optical disk 1 while the selection of the laser diode is switched at a frequency sufficiently high to allow to detect S-curves originating from the spot 21 being focused at the front surface and/or information layer of any of possible disk types, here BD-disks, DVD-disks and CD-disks. The example of FIG. 15 uses OPU-C. The corresponding objective lens 21B, 21D, 21C is selected simultaneously, e.g. by selecting a BD-, DVD- or CD-lightpath with a common focus actuator comprising each of the objective lenses 21B, 21D, 21C. Alternatively, objective lenses 21B, 21D, 21C are physically a single objective lens, where the beams 11B, 11D, 11C as directed to the objective lens are provided with different pupil sizes, resulting in different NAs for each of the objective lenses 21B, 21D, 21C.

The situations of FIG. 14a correspond to the time moment during the movement indicated with symbol A in FIG. 15. The situations of FIG. 14b correspond to the time moment indicated with symbol B in FIG. 15. The situations of FIG. 14c correspond to the time moment indicated with symbol C in FIG. 15.

The upper trace shows the focus error signal FE when the disk is a BD-type disk with a substrate thickness of 0.1 mm. S-curve s1 corresponds to spot 21C from laser diode 15I being substantially focused with objective lens 18C with an NA of 0.50 on the front surface 5B of the BD-disk. S-curve s2 corresponds to spot 21C from laser diode 15I being substantially focused with objective lens 18C on the information layer 6B of the BD-disk. S-curve s11 corresponds to spot 21D from laser diode 15R being substantially focused with objective lens 18D with an NA of 0.65 on the front surface 5B of the BD-disk. S-curve s12 corresponds to spot 21D from laser diode 15R being substantially focused with objective lens 18D on the information layer 6B of the BD-disk. S-curve s21 corresponds to spot 21B from laser diode 15B being substantially focused with objective lens 18B with an NA of 0.85 on the front surface 5B of the BD-disk. S-curve s22 corresponds to spot 21B from laser diode 15B being substantially focused with objective lens 18B on the information layer 6B of the BD-disk.

The middle trace shows the focus error signal FE when the disk is a DVD-type disk with a substrate thickness of 0.6 mm. S-curve s3 corresponds to spot 21C from laser diode 15I being substantially focused with objective lens 18C with an NA of 0.50 on the front surface 5D of the DVD-disk. S-curve s13 corresponds to spot 21D from laser diode 15R being substantially focused with objective lens 18D with an NA of 0.65 on the front surface 5D of the DVD-disk. S-curve s5 corresponds to spot 21C from laser diode 15I being substantially focused with objective lens 18C with an NA of 0.50 on the information layer 6D of the DVD-disk. S-curve s15 corresponds to spot 21D from laser diode 15R being substantially focused with objective lens 18D with an NA of 0.65 on the information layer 6D of the DVD-disk. S-curve s23 corresponds to spot 21B from laser diode 15B being substantially focused with objective lens 18B with an NA of 0.85 on the front surface 5D of the DVD-disk.

The lower trace shows the focus error signal FE when the disk is a CD-type disk with a substrate thickness of 1.1-1.2 mm. S-curve s4 corresponds to spot 21C from laser diode 15I being substantially focused with objective lens 18C with an NA of 0.50 on the front surface 5C of the CD-disk. S-curve s14 corresponds to spot 21D from laser diode 15R being substantially focused with objective lens 18D with an NA of 0.65 on the front surface 5C of the CD-disk. S-curve s6 corresponds to spot 21C from laser diode 15I being substantially focused with objective lens 18C with an NA of 0.50 on the information layer 6C of the CD-disk. S-curve s24 corresponds to spot 21B from laser diode 15B being substantially focused with objective lens 18B with an NA of 0.85 on the front surface 5C of the CD-disk. S-curve s16 corresponds to spot 21D from laser diode 15R being substantially focused with objective lens 18D with an NA of 0.65 on the information layer 6C of the CD-disk.

Hence, the substrate thickness can be determined in this example according to e.g. the following decision scheme:

1. If, during the movement towards the optical disk 1, two consecutive reflections s1, s2 appear on the CD-laser channel followed by two other reflections s11, s12 on the DVD-laser channel, the optical disk 1 is determined to be a BD disk with a substrate thickness of approximately 0.1 mm. There is enough time for the system to decide to capture focus on the main reflection, associated with s22, with the BD-laser within the same movement towards the optical disk 1;

2. If a first CD-laser reflection s3 is followed by a DVD-laser reflection s13 and after a "relatively short" time a CD-laser reflection s5 appears, the optical disk 1 is determined to be a DVD disk. This may be confirmed by a DVD-laser reflection s15. The "relatively short" time is possible to judge from the speed at which the OPU is moving, which, on its own is possible to judge from the time difference between the CD-laser and DVD-laser reflections;

3. If a first CD-laser reflection s4 is followed by a DVD-laser reflection s14 and after a "relatively long" time no reflection appears on any channels, the optical disk 1 is determined to be a CD disk. This may be confirmed by a CD-laser reflection s6 after a "relatively long" time, possibly extended with a BD-laser reflection s24 quickly following the CD-laser reflection s6.

It will be appreciated that different selection criteria might be applied depending on the used optical design, i.e. when OPU-A, OPU-B or OPU-D is used. However, for each of the optical designs, pre-determined combinations of size/shape and timing of the signals may be used in order to decide the disk type. The method may also be applied with dual or multi layers disks (BD and DVD) with multiple information layers with standardized layers spacing. It is also possible to implement the method when moving away from the optical disk 1 in stead of towards the optical disk 1, and analysing the presence and distances between consecutive reflections in the three channels using a decision scheme that is accordingly adapted.

Figure 16:
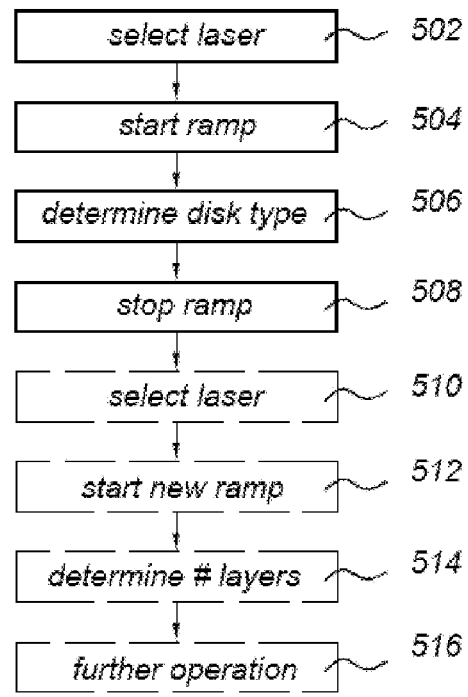
FIG. 16 schematically shows a further embodiment a method according to the invention.

The above described embodiments of methods according to the invention, for use with an optical disk drive with a plurality of lasers, may be further arranged to determine a stop position from the second actuator position, the stop position being within the range of the start actuator position and the end actuator position, and stop the movement of the focus actuator along the focus axis upon reaching the stop position. This is schematically illustrated in FIG. 16. We will refer to "the movement of the focus actuator" as a focus ramp.

FIG. 16 shows that first, a laser is selected from the plurality of lasers 15B, 15R, 15I, in block 502 and the focus ramp is started from the start actuator position towards the end actuator position in block 504. Block 506 then determines, during the focus ramp, using one of the above described methods, the first actuator position and the second actuator position, and from that whether the optical disk 1 is a CD-type, DVD-type or BD-type disk associated with substrate thicknesses of substantially 1.1-1.2 mm, 0.6 mm and 0.1 mm respectively. As soon as the second actuator position has been determined, either quantitatively or qualitatively, a stop position may be determined in block 508. The stop position may correspond to the second actuator position, but may alternatively correspond to e.g. the position at which it was concluded that the width of the front reflection was larger than the pre-determined threshold and the optical disk 1 was determined to be a BD-type disk with a substrate thickness of substantially 0.1 mm. The stop position may alternatively be e.g. a position along the focus ramp after a further displacement for e.g. determining whether the optical disk 1 has more data layers, e.g. whether it is a dual-layer disk.

After the stop position has been determined, the focus ramp is stopped upon reaching the stop position in block 508.

The method may then continue to block 510 where the laser and NA corresponding to the disk type is selected. A new focus ramp is started in block 512. The new focus ramp may again start at the start actuator position, or alternatively e.g. at a position in between the start actuator position and the first actuator position, after which the focus actuator is moved along the focus axis towards the end actuator position. The new focus ramp may alternatively start at the stop position, after which the focus actuator is moved along the focus axis towards the start actuator position. During the new focus ramp, the number of data layers may be determined in block 514. Alternatively or additionally, the new focus ramp may be used to determine a focus gain for the focus error signal and a central aperture gain for the central aperture signal, the focus gain and the central aperture gain being determined for adapting the corresponding signals with the corresponding gain during further use with the optical disk 1, thus adapting signal levels of the signals to be within a pre-determined level range for optimal performance. The method then proceeds to block 516 for further operation with the optical disk 1, the further operation comprising e.g. applying another focus ramp with the focus gain applied to the focus error signal FE, focusing on the information layer 6, tracking a track 3 on the optical disk 1, and e.g. determining further disk type information, such as e.g. write strategy information for writing data to the optical disk 1.

Several of the above described embodiments use a threshold in determining a presence of a reflection peak associated with a data layer of the optical disk 1. In a further aspect, the method is arranged for moving the focus actuator towards the optical disk when moving the focus actuator along the focus axis from the start actuator position towards the end actuator position, determining a first signal level as a sensor output signal level of the sensor output signal when focus actuator is substantially at the first actuator position, determining a threshold level from the first signal level, and using the threshold level in analyzing the sensor output signal for determining the second actuator position.

Figure 17:
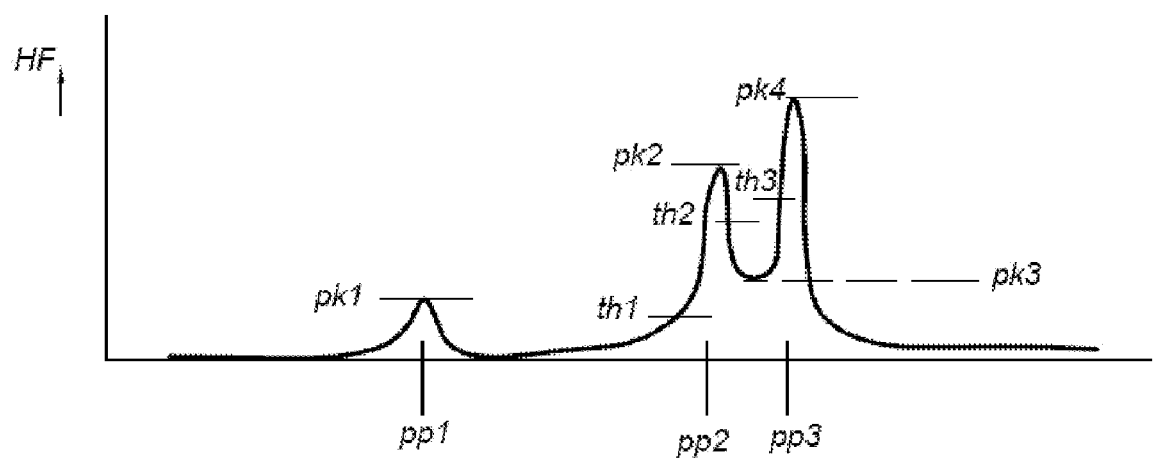
FIG. 17 shows a signal trace for clarifying a further embodiment of the invention.

The further aspect is illustrated with reference to FIG. 17. FIG. 17 shows a central aperture signal HF while the focus actuator, and hence the spot 21, is moved towards the optical disk 1. Around a first actuator position pp1, the spot 21 is substantially focused on the front surface 5 of the optical disk 1. According to the further aspect, a peak level pk1 is determined as a maximum signal level of the central aperture signal HF around the first actuator position pp1, as is shown in FIG. 17.

A first threshold level th1 is then determined from the peak level pk1. The first threshold level th1 may e.g. a fraction, e.g. in a range of 25% to 100%, of the peak level pk1. In the example shown in FIG. 17, the first threshold level th1 is determined as 50% of the peak level pk1. The first threshold level th1 serves as the threshold for observing a reflection peak associated with the spot 21 focusing on a data layer. Determining the first threshold level from the peak level pk1 of the front reflection may be advantageous for accounting for e.g. light path efficiency losses, spot intensity, laser intensity.

When the movement of the spot 21 continues, the reflection peak associated with the spot 21 focusing on the data layer reaches a maximum level pk2 when the spot 21 is optimally focused on the data layer at a second actuator position pp2.

For detecting a second data layer, the inventors have recognized that the method may comprise detecting a drop of the signal level of the central aperture signal HF to a substantially non-zero level, followed by another increase if the signal level.

For this purpose, a second threshold th2 may determined from the maximum level pk2. The second threshold level th2 may e.g. a fraction, e.g. in a range of 10% to 90%, of the peak level pk2. In the example shown in FIG. 17, the second threshold level th2 is determined as 70% of the peak level pk2.

For detecting the increase after the drop, a minimum level pk3 of the signal level is determined from the continued the movement of the spot 21.

A third threshold level th3 is determined from the minimum level pk3 and, in an embodiment, the maximum level pk2. The third threshold level th3 may e.g. a fraction, e.g. in a range of 10% to 90%, of a sum of the maximum level pk2 and the minimum level pk3. In the example shown in FIG. 17, the third threshold level th3 is determined as 50% of sum of the maximum level pk2 and the minimum level pk3, i.e. th3=½*(pk2+pk3).

A second data layer is determined to be present when the central aperture signal HF increased beyond the third threshold level th3. When the movement of the spot 21 continues, the reflection peak associated with the spot 21 focusing on the second data layer reaches a maximum level pk4 when the spot 21 is optimally focused on the data layer at a third actuator position pp3.

If it is thus detected that the optical disk is a multi-layer disk comprising at least a first data layer and a second data later associated with the second and the third actuator positions pp2 and pp3, the disk type may be confirmed by determining the ratio of layer spacing and substrate thickness, corresponding to the ratio of focus actuator displacement from the first data layer to the second data layer and from the front surface to first data layer, i.e. from (pp3−pp2)/(pp2−pp1). This ratio is independent of the exact speed of the movement of the focus actuator, as long as the speed is substantially constant during the movement. This ratio may thus be used to confirm the disk type with almost absolute certainty. This ratio may also be used to calibrate the relationship between the displacement of the focus actuator and substrate thickness.

The methods described above may be implemented in an optical disk drive, preferably in the processor CON, or system controller SYSCON of the optical disk drive, or in an apparatus cooperating with an optical disk drive and communicating with the processor CON or system controller SYSCON over the interface 79.

Figure 18:
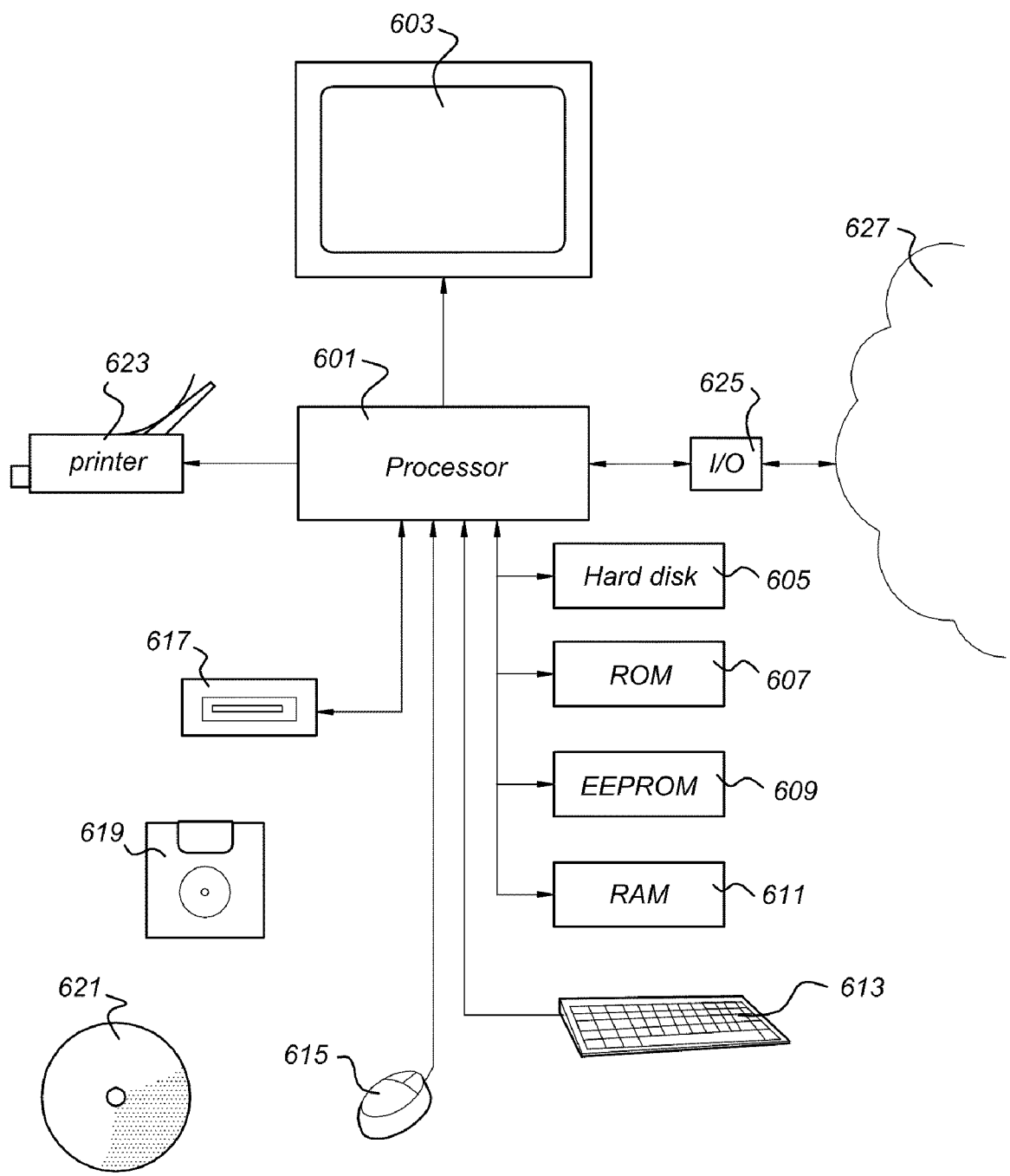
FIG. 18 shows an overview of a computer arrangement that can be used to carry out the method according to the invention.

In FIG. 18, an overview is given of a computer arrangement that can be used to carry out the method according to the invention. The arrangement comprises a processor 601 for carrying out arithmetic operations.

The processor 601 is connected to a plurality of memory components, including a hard disk 605, Read Only Memory (ROM) 607, Electrically Erasable Programmable Read Only Memory (EEPROM) 609, and Random Access Memory (RAM) 611. Not all of these memory types need necessarily be provided. Moreover, these memory components need not be located physically close to the processor 601 but may be located remote from the processor 601. The processor 601 is also connected to means for inputting instructions, data etc. by a user, like a keyboard 613, and a mouse 615. Other input means, such as a touch screen, a track ball and/or a voice converter, known to persons skilled in the art may be provided too. A reading unit 617 connected to the processor 601 is provided. The reading unit 617 is arranged to read data from and possibly write data on a data carrier like a floppy disk 619 or a CD 621. Other data carriers may be tapes, DVD, BD, etc. as is known to persons skilled in the art. The processor 601 is also connected to a printer 623 for printing output data on paper, as well as to a display 603, for instance, a cathode-ray tube monitor or a LCD (Liquid Crystal Display) screen, or any other type of display known to persons skilled in the art. The processor 1 may be connected to a communication network 627, for instance, the Public Switched Telephone Network (PSTN), a Local Area Network (LAN), a Wide Area Network (WAN), etc. by means of I/O means 625. The processor 601 may be arranged to communicate with other communication arrangements through the network 627. The data carrier 619, 621 may comprise a computer program product in the form of data and instructions arranged to provide the processor with the capacity to perform a method in accordance with the invention. However, such computer program product may, alternatively, be downloaded via the telecommunication network 627. The processor 601 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 601 through the network 627.

It should be noted that the above-mentioned embodiments illustrate rather than limit the invention, and that those skilled in the art will be able to design many alternative embodiments without departing from the scope of the appended claims. The skilled person will be able to make combinations of elements described in different embodiments within the scope of the invention and without departing from the scope of the appended claims. E.g., a digital signal may be used where an analogue signal is suggested and vice versa, without departing from the scope of the invention and the appended claims. Also, the invention may be analogously applied for e.g. other disk types and other optical disk drive configurations than those explicitly described in the embodiments above. In the claims, any reference signs and symbols placed between parentheses shall not be construed as limiting the claim. Throughout this document, the term "and/or" includes any and all combinations of one or more of the associated listed items.

What is claimed is:

1. A method of determining a disk type of an optical disk comprising steps of:
   using a first light path for forming an incident beam;
   moving an objective lens system corresponding to the first light path from a start position towards the optical disk;
   receiving a sensor output signal during the movement of the objective lens system, wherein the sensor output signal includes a central aperture signal;
   determining a first position of the central aperture signal where the central aperture signal crosses a first threshold in an upward direction;
   determining a second position the central aperture signal where the central aperture signal crosses a second threshold in an downward direction;
   setting a pre-determined time displacement along the time axis of the central aperture signal; and
   determining the disk type of the optical disk by determining whether the second position located within the pre-determined displacement relative to the first position.

2. The method according to claim 1, wherein if the second position located within the pre-determined time displacement relative to the first position, the disk type is indicated as a BD-type disk; otherwise, the disk type is indicated as an non-BD-type disk.

3. A method of determining a disk type of an optical disk comprising steps of:
   using a first light path for forming an incident beam;
   moving an objective lens system corresponding to the first light path from a start position towards the optical disk;
   receiving a sensor output signal during the movement of the objective lens system, wherein the sensor output signal includes a central aperture signal;
   determining a first position of the central aperture signal where the central aperture signal crosses a first threshold in an upward direction;
   determining a second position the central aperture signal where the central aperture signal crosses a second threshold in an downward direction;
   setting a pre-determined time width;
   determining a time width of the central aperture signal between the first position and the second position; and
   determining the disk type of the optical disk by comparing the time width of the central aperture signal with the pre-determined time width.

4. The method according to claim 3, wherein if the time width of the central aperture signal is larger than the predetermined time width, the disk type is indicated as a BD-type disk; otherwise, the disk type is indicated as an non-BD-type disk.

5. The method according to claim 4, wherein the sensor output signal includes a focus error signal, and the method further comprises steps of:
   setting a first pre-determined time distance if the time width of the central aperture signal is not larger than the pre-determined time width;
   analyzing whether a S-curve of the focus error signal or a reflection peak of the central aperture signal is found within the first pre-determined time distance; and
   if found, indicating the disk type as a DVD-type disk.

6. The method according to claim 5 further comprising steps of:
   setting a second pre-determined time distance if the S-curve of the focus error signal or the reflection peak of the central aperture signal is not found within the first pre-determined time distance;
   analyzing whether the S-curve of the focus error signal or the reflection peak of the central aperture signal is found within the second pre-determined time distance; and
   if found, indicating the disk type as a CD-type disk.

7. A method of determining a disk type of an optical disk comprising steps of:
   selecting a first light path from a BD-light path, a DVD-light path and a CD-light path for forming an incident beam;
   moving an objective lens system corresponding to the first light path from a start position towards the optical disk;
   changing to another light path at least once during the same movement of the objective lens system;
   receiving a focus error signal during the movement of the objective lens system, wherein the focus error signal is analyzed to a BD-laser channel corresponding to the BD-light path, a DVD-laser channel corresponding to the DVD-light path, and a CD-laser channel corresponding to the CD-light path;
   if two consecutive S-curve of the focus error signal appear on the CD-laser channel followed by two other S-curve of the focus error signal on the DVD-laser channel during the same movement of the objective lens system, indicating the disk type as a BD-type disk;
   if a S-curve of the focus error signal appears on the CD-laser channel followed by an other S-curve of the focus error signal on the DVD-laser channel, and an another S-curve of the focus error signal appears on the CD-laser channel after a relatively short time during the same movement of the objective lens system, indicating the disk type as a DVD-type disk; and
   if a S-curve of the focus error signal appears on the CD-laser channel followed by an other S-curve of the focus error signal on the DVD-laser channel, and no S-curve of the focus error signal appears on any channels after a relatively long time during the same movement of the objective lens system, indicating the disk type as a CD-type disk.

\* \* \* \* \*